United States Patent
Wen et al.

(10) Patent No.: US 9,761,058 B2
(45) Date of Patent: Sep. 12, 2017

(54) IMAGE PROCESSING APPARATUS AND IMAGE PROCESSING METHOD

(71) Applicant: SONY CORPORATION, Tokyo (JP)

(72) Inventors: Shihhao Wen, Tokyo (JP); Kazuki Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 14/243,934

(22) Filed: Apr. 3, 2014

(65) Prior Publication Data

US 2014/0334715 A1 Nov. 13, 2014

(30) Foreign Application Priority Data

May 9, 2013 (JP) .................................. 2013-099599

(51) Int. Cl.
*G06K 9/00* (2006.01)
*G06T 19/20* (2011.01)
*G06T 7/593* (2017.01)

(52) U.S. Cl.
CPC .............. *G06T 19/20* (2013.01); *G06T 7/593* (2017.01); *G06T 2207/10021* (2013.01); *G06T 2207/10024* (2013.01)

(58) Field of Classification Search
None
See application file for complete search history.

(56) References Cited

U.S. PATENT DOCUMENTS

| 6,144,758 | A | * | 11/2000 | Fukushima | G06K 9/00127 382/128 |
| 6,215,898 | B1 | * | 4/2001 | Woodfill | G06K 9/32 348/47 |
| 2012/0069009 | A1 | * | 3/2012 | Shimoyama | H04N 13/026 345/419 |
| 2012/0249536 | A1 | * | 10/2012 | Sutou | H04N 13/0011 345/419 |
| 2013/0051660 | A1 | * | 2/2013 | Shibuhisa | H04N 13/0022 382/154 |

FOREIGN PATENT DOCUMENTS

JP 2010-211036 9/2010

* cited by examiner

*Primary Examiner* — Chan Park
*Assistant Examiner* — Elisa Rice
(74) *Attorney, Agent, or Firm* — Paratus Law Group, PLLC

(57) ABSTRACT

There is provided an image processing apparatus that includes a coefficient setting section, and a processing section. The coefficient setting section is configured to set a filter coefficient based on a correlation value in a color image. The processing section is configured to perform filter processing on a disparity image of the color image for correction of the disparity image, the filter processing being performed using the filter coefficient set by the coefficient setting section.

13 Claims, 33 Drawing Sheets

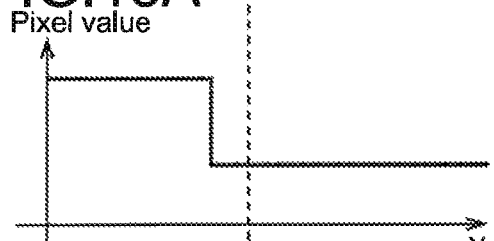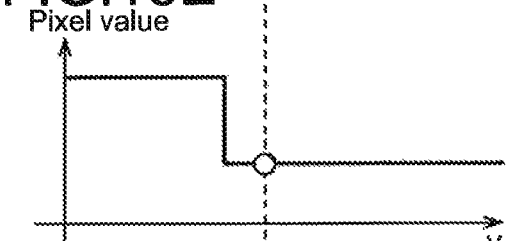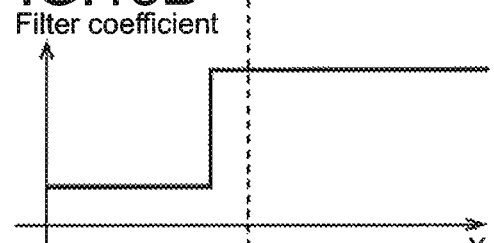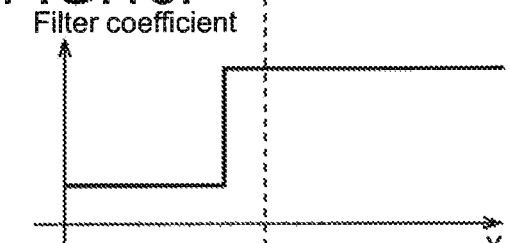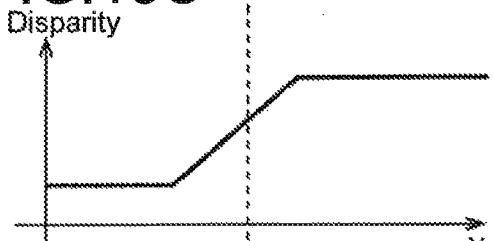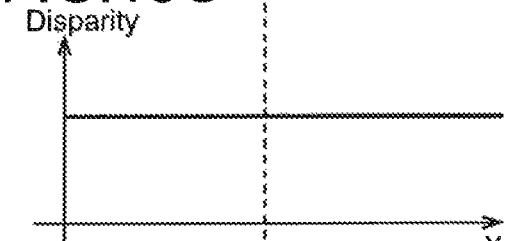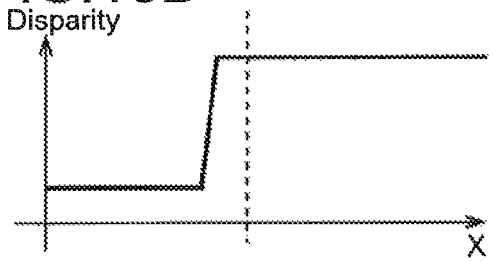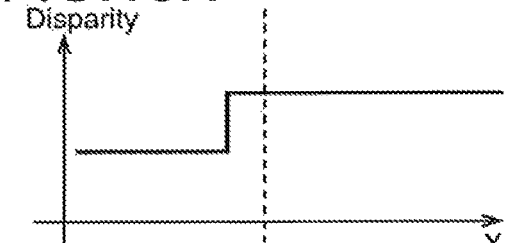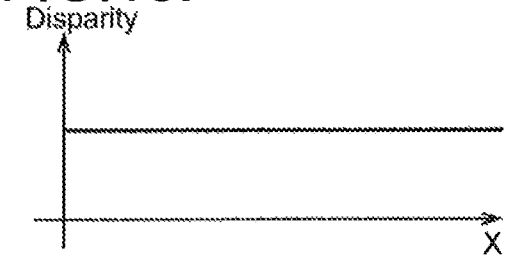

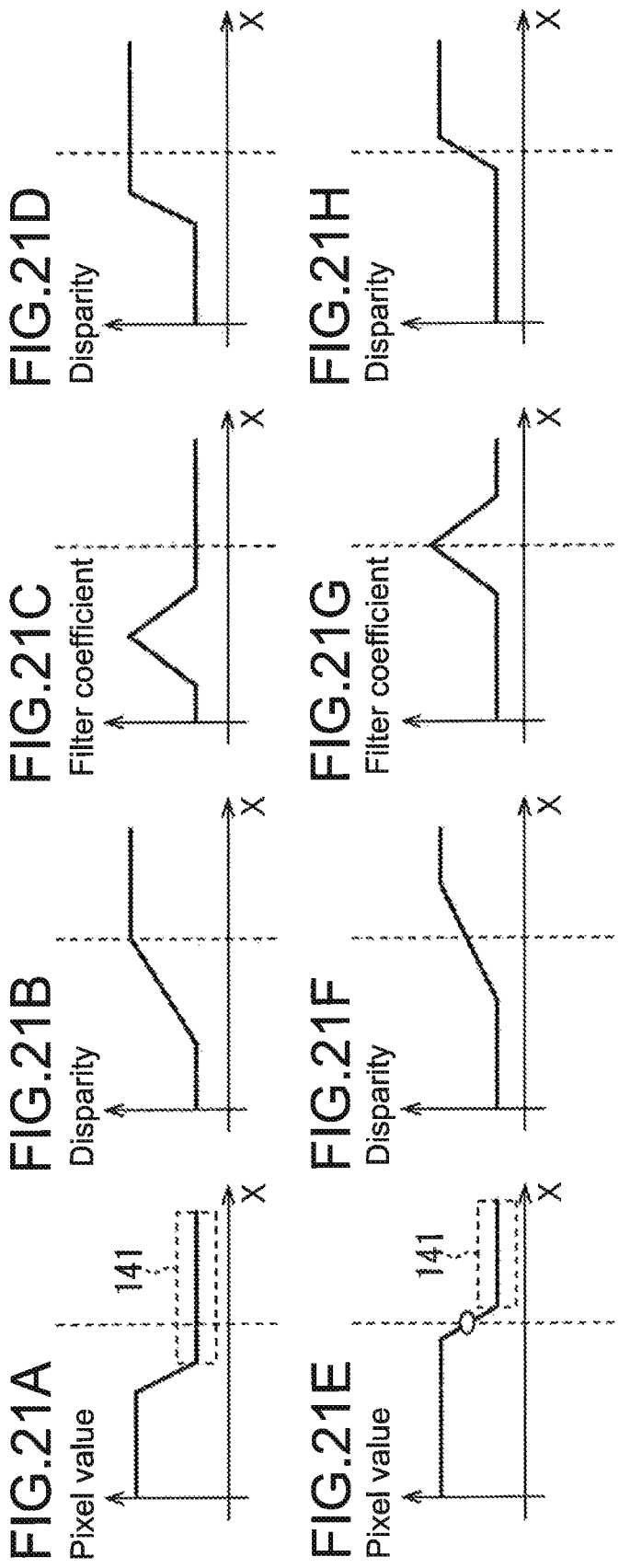

Filter coefficient

Disparity

Filter coefficient

Disparity

IMAGE PROCESSING APPARATUS AND IMAGE PROCESSING METHOD

CROSS REFERENCE TO RELATED APPLICATIONS

This application claims the benefit of Japanese Priority Patent Application JP 2013-099599 filed May 9, 2013, the entire contents of which are incorporated herein by reference.

BACKGROUND

The present disclosure relates to an image processing apparatus and method and, more specifically, to an image processing apparatus and method with which a disparity image is generated with a high degree of precision.

Three-dimensional (3D) images have been recently receiving attention, and display apparatuses are becoming available for display of such 3D images. As an example, refer to Japanese Patent Application Laid-open No. 2010-211036. A 3D image includes two or more color images viewed from different viewpoints, and these different-viewpoint color images are captured by imaging or generated using a disparity image (disparity map). This disparity image provides pixel values, which are disparities between each pair of pixels in a color image obtained by imaging from another viewpoint.

The disparity image may be generated using a plurality of color images obtained by imaging from different viewpoints, or generated by estimation using a color image obtained by imaging from one viewpoint. Generating a disparity image with a high degree of precision expects a high rate of throughput and a large-sized circuit. It means generating a disparity image with a high degree of precision may be difficult depending on the allowable rate of throughput or the allowable size of a circuit. When the precision of a disparity image is not high enough, the resulting color image to be generated using the disparity image may suffer from distortion, for example.

Moreover, when a disparity image is obtained using a plurality of different-viewpoint color images that are disparity-compressed at the time of imaging, or if any local change of disparity is not detected with a high degree of precision when a disparity image is generated, a change of disparity in the resulting disparity image may be small. As a result, in a 3D image obtained using the disparity image, the cardboard effect may be caused.

SUMMARY

There thus is a demand for correcting a generated disparity image to make the disparity image high in precision.

It is thus desirable to generate a disparity image with a high degree of precision.

According to an embodiment of the present disclosure, there is provided an image processing apparatus that includes a coefficient setting section, and a processing section. The coefficient setting section is configured to set a filter coefficient based on a correlation value in a color image. The processing section is configured to perform filter processing on a disparity image of the color image for correction thereof, the filter processing being performed using the filter coefficient set by the coefficient setting section.

An image processing method according to an embodiment of the present disclosure corresponds to an image processing apparatus according to an embodiment of the present disclosure.

In an embodiment of the present disclosure, a filter coefficient is set based on a correlation value in a color image, and using the filter coefficient, filter processing is performed on a disparity image of the color image for correction thereof.

Note that an image processing apparatus according to an embodiment of the present disclosure is implemented by a computer running a program.

For implementing an image processing apparatus according to an embodiment of the present disclosure, a program for running by a computer may be distributed by transmission via a transmission medium or recording on a recording medium.

According to an embodiment of the present disclosure, a disparity image is generated with a high degree of precision.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 18A to 18I are each a diagram showing an exemplary after-correction disparity image to be generated by a processing section of FIG. 17;

FIGS. 21A to 21H are each a diagram showing an exemplary disparity image being a result of correction using before-correction filter coefficients;

DETAILED DESCRIPTION OF EMBODIMENTS

Hereinafter, embodiments of the present disclosure will be described with reference to the drawings.

[First Embodiment]
(Exemplary Configuration of Image Processing Apparatus in First Embodiment)

Figure 1:
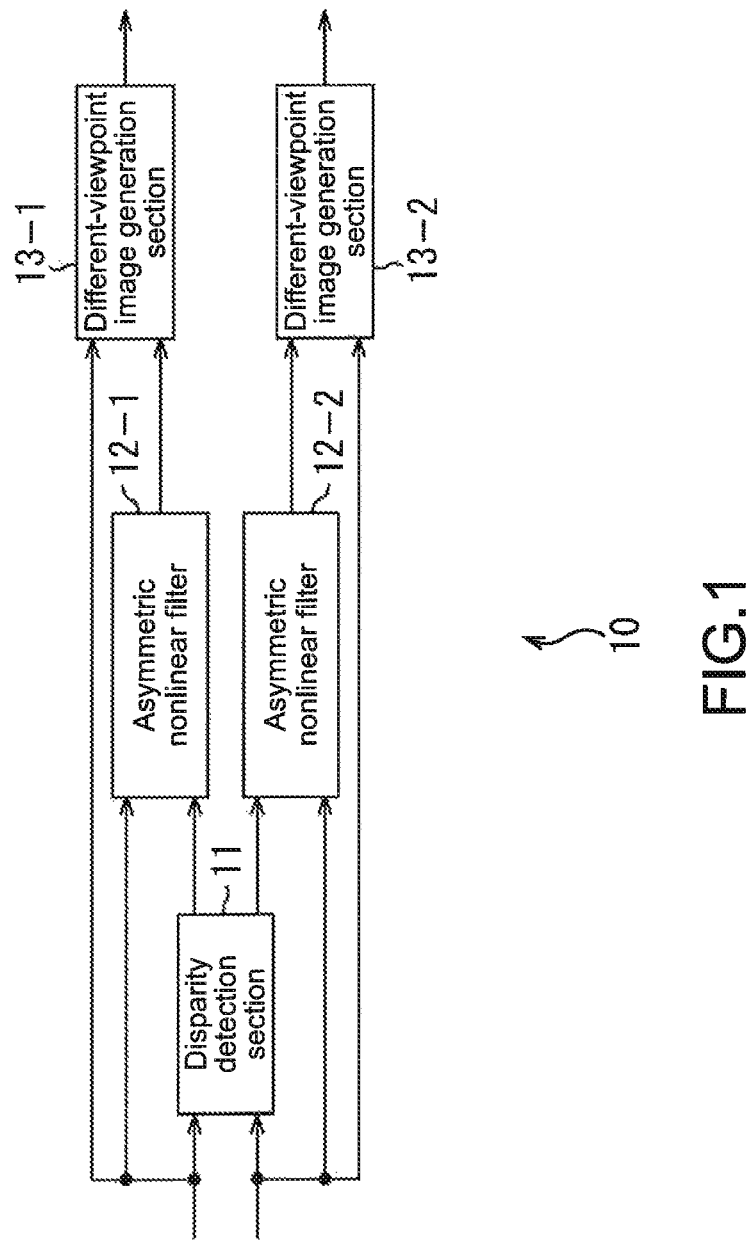
FIG. 1 is a block diagram showing an exemplary configuration of an image processing apparatus in a first embodiment with the application of the present disclosure.

FIG. 1 is a block diagram showing an exemplary configuration of an image processing apparatus in a first embodiment with the application of the present disclosure.

An image processing apparatus 10 of FIG. 1 includes a disparity detection section 11, asymmetric nonlinear filters 12-1 and 12-2, and different-viewpoint image generation sections 13-1 and 13-2. The image processing apparatus 10 generates a disparity image, and corrects the disparity image before using the image to generate a color image of a predetermined viewpoint.

To be specific, the disparity detection section 11 in the image processing apparatus 10 obtains, from the outside, two color images in a 3D image. One color image is a right-eye color image of a predetermined viewpoint, and the other color image is a left-eye color image of a predetermined viewpoint. Using these obtained right- and left-eye color images, the disparity detection section 11 generates disparity images respectively corresponding to the right- and left-eye color images by matching, for example.

In this Specification, a larger disparity means the depth position being toward the front, and a smaller disparity means the depth position being toward the back. When a disparity is an intermediate value, it means the depth position being on the display plane. The disparity detection section 11 provides the left-eye disparity image to the asymmetric nonlinear filter 12-1, and the right-eye disparity image to the asymmetric nonlinear filter 12-2.

The asymmetric nonlinear filter 12-1 is a one-dimensional (1D) horizontal FIR (finite impulse response) filter, for example. The asymmetric nonlinear filter 12-1 finds a correlation value for each pair of pixels in the left-eye color image provided from the outside. The asymmetric nonlinear filter 12-1 then sets a filter coefficient for each of the pixels based on the found correlation values. Using the filter coefficients, the asymmetric nonlinear filter 12-1 performs filter processing on the left-eye disparity image provided by the disparity detection section 11, thereby correcting the left-eye disparity image. The asymmetric nonlinear filter 12-1 supplies the resulting left-eye disparity image to the different-viewpoint image generation section 13-1.

The asymmetric nonlinear filter 12-2 is configured similarly to the asymmetric nonlinear filter 12-1. That is, the asymmetric nonlinear filter 12-2 finds a correlation value for each pair of pixels in the right-eye color image provided from the outside. The asymmetric nonlinear filter 12-2 then sets a filter coefficient for each of the pixels based on the found correlation values. Using the filter coefficients, the asymmetric nonlinear filter 12-2 performs filter processing on the right-eye disparity image, thereby correcting the right-eye disparity image. The asymmetric nonlinear filter 12-2 supplies the resulting right-eye disparity image to the different-viewpoint image generation section 13-2.

In this example, the asymmetric nonlinear filters 12-1 and 12-2 are each a 1D horizontal FIR filter or others, but alternatively, may be each a two-dimensional (2D) FIR filter or others.

Using both the after-correction left-eye disparity image provided by the asymmetric nonlinear filter 12-1 and the left-eye color image input to the image processing apparatus 10, the different-viewpoint image generation section 13-1 generates a left-eye color image of a viewpoint different from that of the color image in use. The different-viewpoint image generation section 13-1 then outputs the resulting left-eye color image.

The different-viewpoint image generation section 13-2 is configured similarly to the different-viewpoint image generation section 13-1. That is, using the after-correction right-eye disparity image provided by the asymmetric nonlinear filter 12-2 and the right-eye color image input to the image processing apparatus 10, the different-viewpoint image generation section 13-2 generates a right-eye color image of a viewpoint different from that of the color image in use. The different-viewpoint image generation section 13-2 then outputs the resulting right-eye color image.

In the below, when these asymmetric nonlinear filters 12-1 and 12-2 are not expected to be specifically distinguished, the filters may be collectively referred to as asymmetric nonlinear filter 12. Similarly, the different-viewpoint image generation sections 13-1 and 13-2 may be collectively referred to as different-viewpoint image generation section 13, and the right- and left-eye color images may be collectively referred to as color image.

(Exemplary Configuration of Asymmetric Nonlinear Filter)

Figure 2:
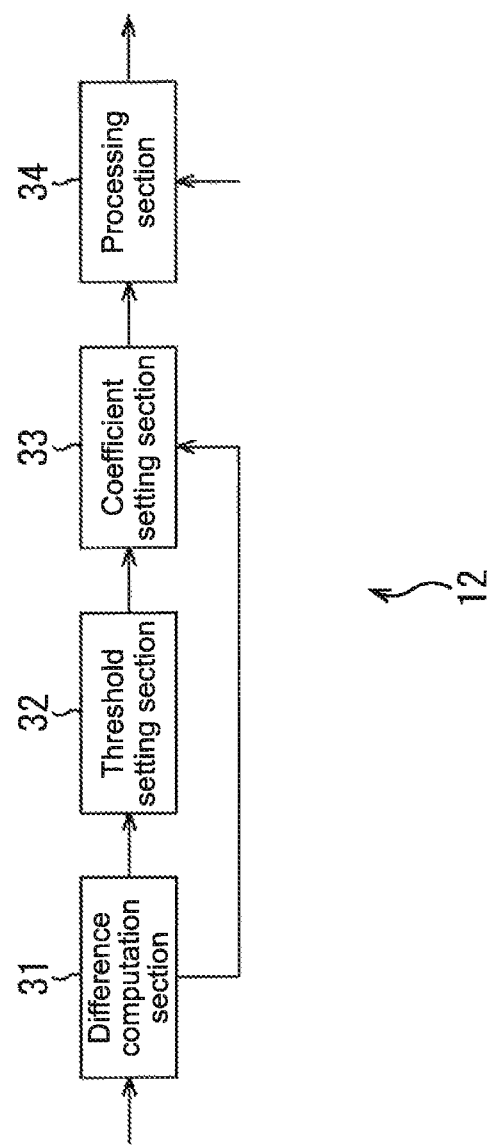
FIG. 2 is a block diagram showing an exemplary configuration of an asymmetric nonlinear filter of FIG. 1.

FIG. 2 is a block diagram showing an exemplary configuration of the asymmetric nonlinear filter 12 of FIG. 1.

The asymmetric nonlinear filter 12 of FIG. 2 includes a difference computation section 31, a threshold setting section 32, a coefficient setting section 33, and a processing section 34.

The difference computation section 31 in the asymmetric nonlinear filter 12 computes a correlation value between each pair of pixels in a color image provided from the outside, i.e., between a pixel consecutively selected as a process-target pixel and each one pixel peripheral to the process-target pixel. The obtained correlation values are used as those of the process-target pixel on the screen. To be specific, the difference computation section 31 computes the absolute value of a difference between a value of the process-target pixel and a value of each of the peripheral pixels thereof.

Herein, the expression of "peripheral pixels" denotes pixels that are used for filter processing of the process-target pixel, and are aligned with the process-target pixel in the horizontal direction being the direction for the filter processing (hereinafter, these pixels are referred to as reference pixels). The expression of "peripheral pixels" also denotes pixels aligned with the process-target pixel in the direction orthogonal to the direction for filter processing.

Among the computed absolute values of the pixel-value differences, the difference computation section 31 provides the threshold setting section 32 with the absolute values of the pixel-value differences between the process-target pixel and each of its peripheral pixels thereabove and therebelow. The difference computation section 31 provides the coefficient setting section 33 with the absolute values of the pixel-value differences between the process-target pixel and each of its reference pixels.

The threshold setting section 32 sets a threshold for use of setting a filter coefficient that will be described later. This threshold setting is made based on the absolute value of the pixel-value difference being the smallest among those provided by the difference computation section 31. This threshold setting is described in Japanese Patent Application Laid-open No. 2007-128206, for example. The threshold setting section 32 supplies the resulting threshold to the coefficient setting section 33.

The coefficient setting section 33 sets a filter coefficient for each of the reference pixels based both on the threshold provided by the threshold setting section 32 and the absolute values of the pixel-value differences provided by the difference computation section 31. The coefficient setting section 33 then supplies the processing section 34 with the set filter coefficient.

Using the filter coefficients provided by the coefficient setting section 33, the processing section 34 performs filter processing on disparities of the reference pixels, thereby correcting a disparity of the process-target pixel. The reference pixels are those in the disparity image provided by the disparity detection section 11 of FIG. 1. The processing section 34 then supplies the different-viewpoint image generation section 13 of FIG. 1 with an after-correction disparity image, which is a disparity image in which disparities of pixels are all corrected.

(Exemplary Peripheral Pixels)

Figure 3:
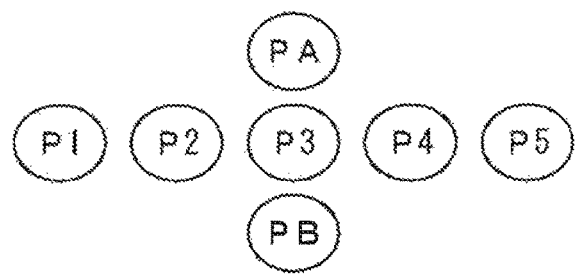
FIG. 3 is a diagram showing exemplary peripheral pixels.

FIG. 3 is a diagram showing exemplary peripheral pixels.

In FIG. 3, a circle represents a pixel.

In the example of FIG. 3, the peripheral pixels are pixels PA and PB above and below a process-target pixel P3, and reference pixels. The reference pixels include two pixels P1 and P2 on the left side of the process-target pixel P3, and two pixels P4 and P5 on the right side thereof.

In this case, a threshold TH is set by Equation 1 below.

[Equation 1]

$$TH = \min(\text{abs}(PA-P3), \text{abs}(PB-P3)) \times b + a \qquad 1$$

In Equation 1, "a" and "b" each denote a predetermined value.

According to Equation 1, the threshold TH is set based on the absolute value of a pixel-value difference between the process-target pixel P3 and the pixel PA, or the absolute value of a pixel-value difference between the process-target pixel P3 and the pixel PB, whichever is smaller.

The threshold TH is then used as a basis to set a filter coefficient Ki (i=1, 2, 3, 4, 5) for a pixel Pi (i=1, 2, 3, 4, 5) being a reference pixel by Equation 2 below.

[Equation 2]

$$Ki = F(\text{abs}(Pi-P3)) \qquad 2$$

In Equation 2, "F" denotes a predetermined function. According to Equation 2, the filter coefficient Ki is a value of the function F related to the absolute value of a pixel-value difference between the pixels Pi and P3.

The processing section 34 performs filter processing by Equation 3 below using the filter coefficient Ki.

[Equation 3]

$$RD = \text{sum}(Ki \times Di)/\text{sum}(Ki) \qquad 3$$

In Equation 3, "RD" denotes a value of the pixel P3 after correction of disparity, and "Di" (i=1, 2, 3, 4, 5) denotes a value of the pixel Pi before the correction of disparity.

(Exemplary Function F)

Figure 4:
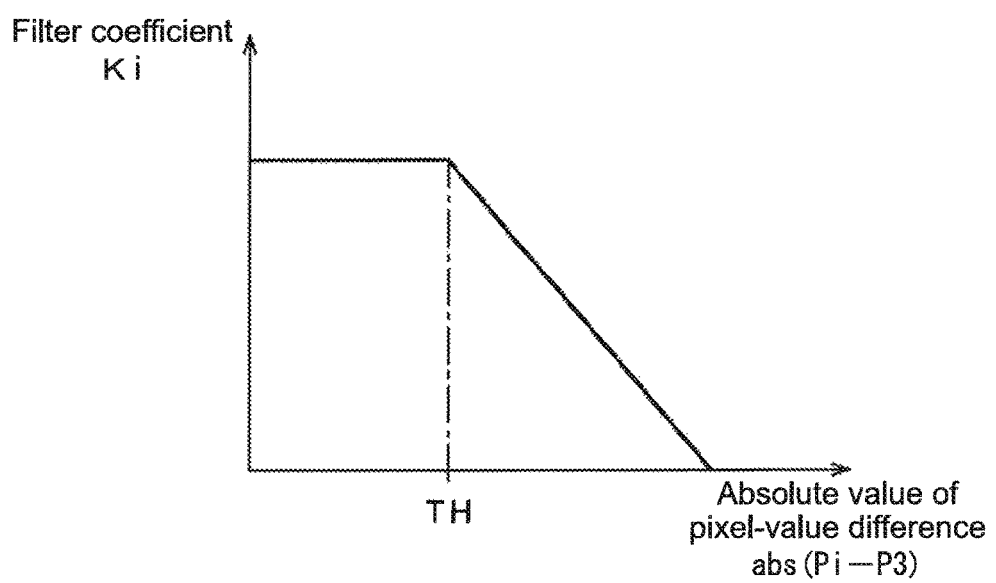
FIG. 4 is a diagram showing an exemplary function F in Equation 2.

FIG. 4 is a diagram showing an exemplary function F in Equation 2.

In FIG. 4, the lateral axis represents the absolute value of the pixel-value difference between the pixels Pi and P3, i.e., abs(Pi−P3), and the vertical axis represents the filter coefficient Ki.

With the function F of FIG. 4, the filter coefficient Ki takes the largest value when the absolute value of the pixel-value difference abs(Pi−P3) is smaller than the threshold TH, and is reduced in value when the absolute value of the pixel-value difference abs(Pi−P3) exceeds the threshold TH, i.e., the larger the absolute value of the pixel-value difference abs(Pi−P3) is, the smaller the threshold TH becomes.

(Exemplary Disparity Image after Correction)

Figure 5:
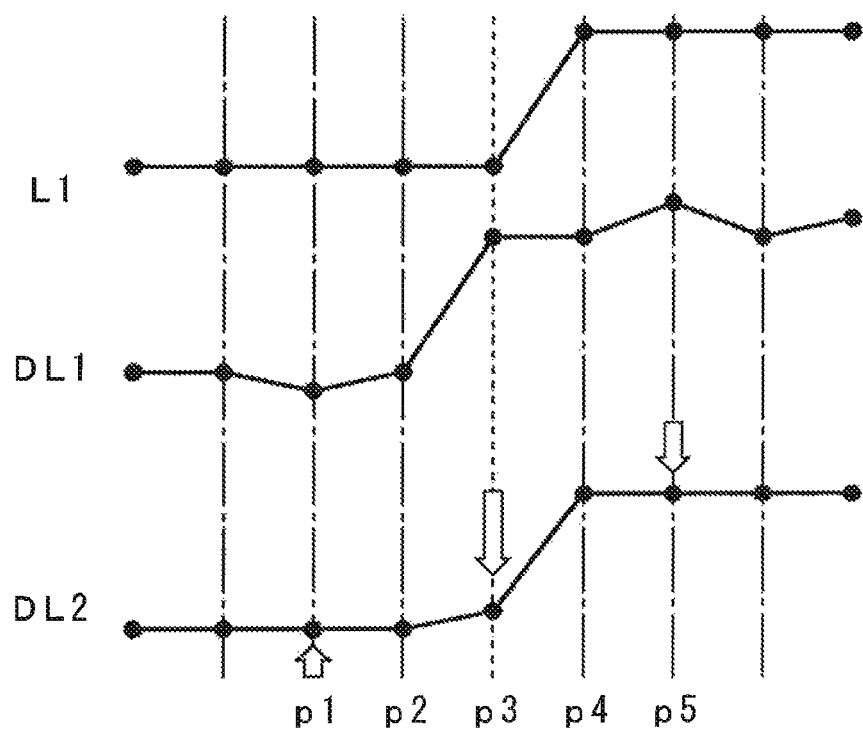
FIG. 5 is a diagram showing an exemplary after-correction disparity image to be generated by a processing section of FIG. 2.

FIG. 5 is a diagram showing an exemplary after-correction disparity image to be generated by the processing section 34 of FIG. 2.

In FIG. 5, "L1" denotes pixel values in an input color image, "DL1" denotes disparities in a before-correction disparity image corresponding to the color image, and "DL2" denotes disparities in an after-correction disparity image. Also in FIG. 5, the lateral axis represents the horizontal positions of pixels.

In the example of FIG. 5, the pixel values L1 in the color image show a great change at a pixel position p3. However, the disparities DL1 in the before-correction disparity image show a great change at a pixel position p2. That is, there is a phase shift between the color image L1 and the before-correction disparity image DL1.

In such a case, with the image processing apparatus 10, the disparity of the pixel at the position p3 is so corrected as to be smaller based on the correlation values in the color image L1. That is, the value of the pixel at the position p3 has a high degree of correlation with the values of the pixels on the left side thereof, i.e., the pixels at the positions p1 and p2. Therefore, as to the filter coefficient Ki when the pixel at the position p3 is the process-target pixel, the filter coefficients K1 to K3 each take a large value, and the filter coefficients K4 and K5 each take a small value. Accordingly, the disparity of the pixel at the position p3 is so corrected as to be closer to the disparities of the pixels at the positions p1 and P2. This compensates the phase shift between the color image L1 and the disparity image DL1.

The correlation values in the color image L1 are also used as a basis to smooth the disparities of the pixels both on the right and left sides of the pixel at the position p3. This accordingly reduces noise components or others in the disparity image.

Alternatively, when the largest absolute value of the pixel-value difference takes a comparatively large value, the coefficient setting section 33 may increase the filter coefficients for the pixels whose absolute values of the pixel-value differences are small at the boundary where the absolute values of the pixel-value differences show a great change. This allows enhancement of disparity edge in the after-correction disparity image. In this case, the filter coefficient setting is not simple threshold processing, so that spatial robustness is improved.

(Description of Generating Different-Viewpoint Color Image)

Figure 6:
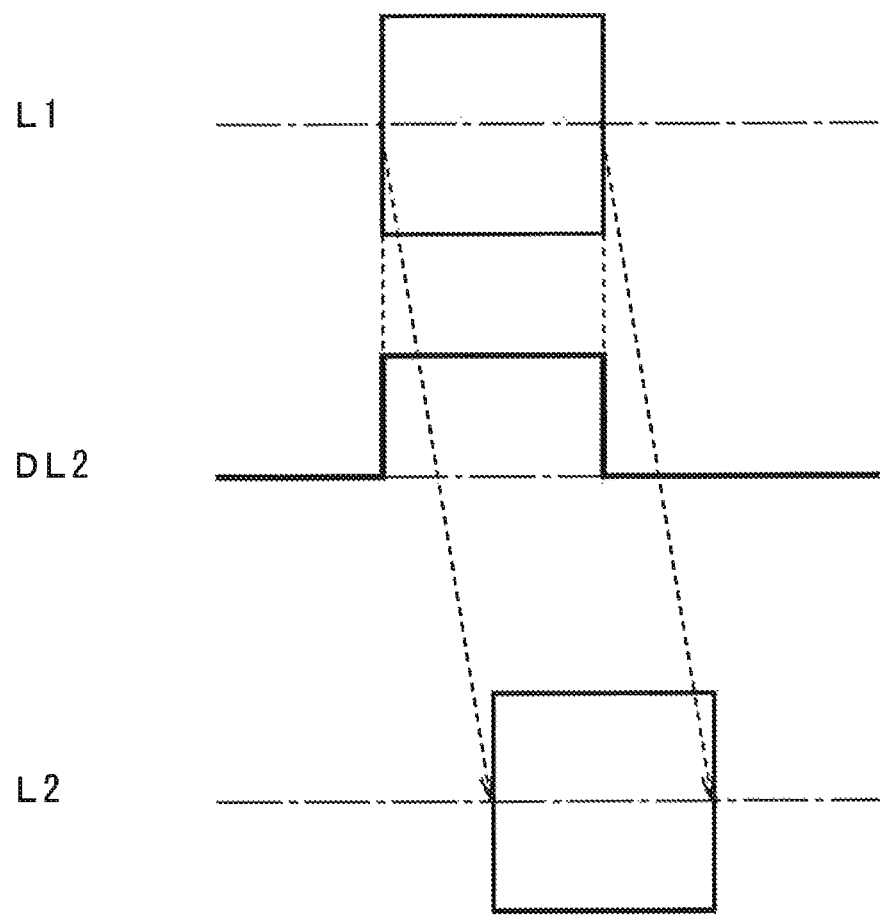
FIG. 6 is a diagram illustrating how a different-viewpoint color image is generated.

FIG. 6 is a diagram illustrating how a different-viewpoint color image is generated by the different-viewpoint image generation section 13 of FIG. 1.

In the example of FIG. 6, "L1" represents a color image with a square portion, and "DL2" represents a disparity image obtained by disparity correction of the color image L1. In the disparity image DL2, disparities of pixels with respect to the square portion of the color image L1 are predetermined in value, and disparities of pixels with respect to the remaining portion of the color image L1 are 0.

In this case, based on the distance between the viewpoint of the color image L1 and that of a color image L2 to be generated, for example, the different-viewpoint image generation section 13 generates a disparity image of the color image L2 using the disparity image DL2. Based on the generated disparity image, for each pixel therein, the different-viewpoint image generation section 13 moves the pixels in the color image L1, thereby generating the color image L2 of FIG. 6. In the example of FIG. 6, a square portion in the color image L2 is moved toward the right compared with the square portion in the color image L1.

Figure 7:
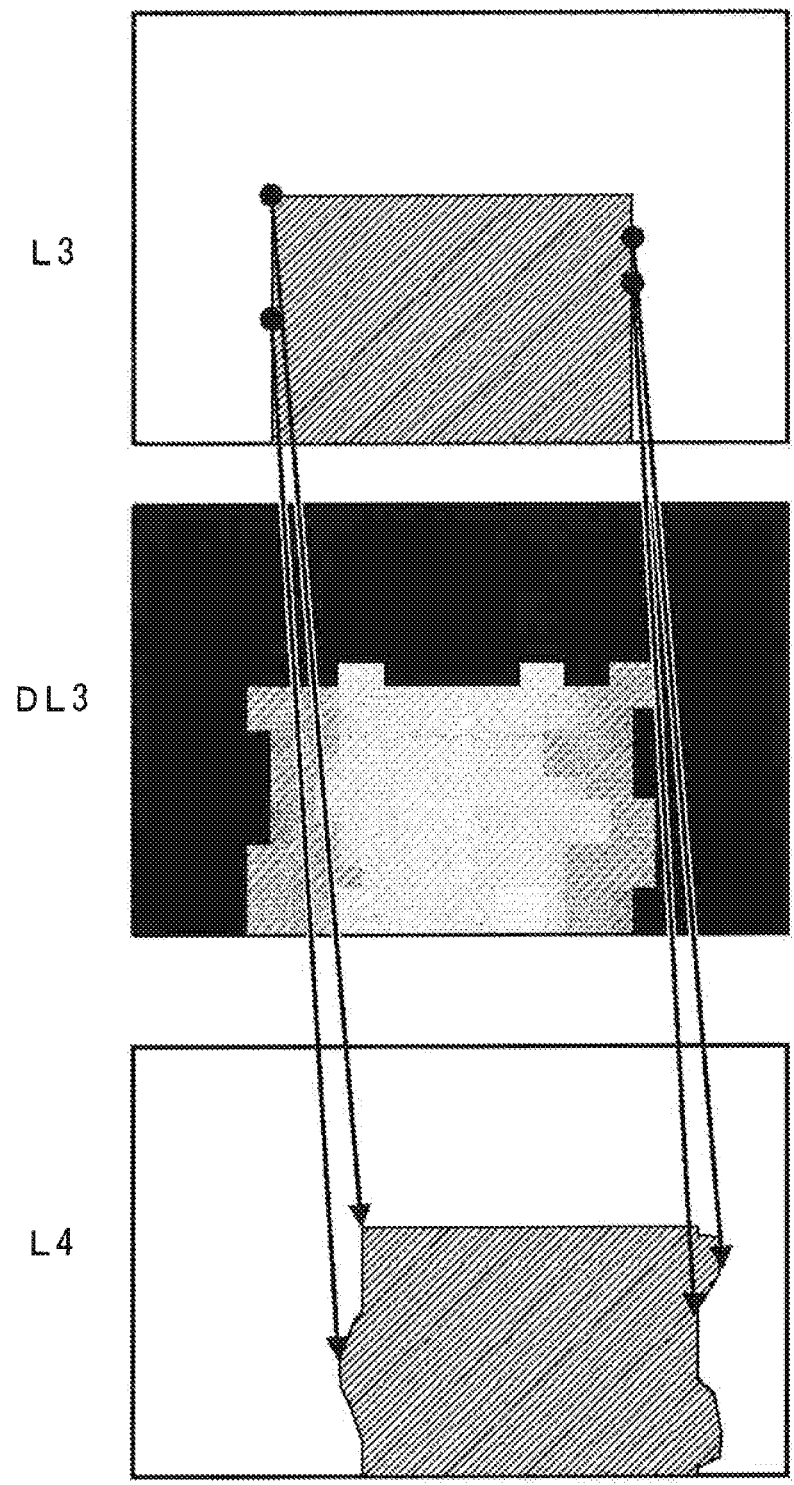
FIG. 7 is a diagram showing an exemplary color image to be generated using a disparity image that is not precise enough.

On the other hand, when a disparity image is not precise enough with no disparity correction, as exemplarily shown in FIG. 7, a disparity image DL3 of a color image L3 with a rectangular portion looks not smooth at the edge of the rectangular portion. Therefore, a disparity image of a color image L4 to be generated also looks not smooth at the edge of a rectangular portion therein. As a result, as is based on the disparity image of the color image L4, pixels in the rectangular portion in the color image L3 are not entirely moved, thereby distorting a rectangular portion in the color image L4.

(Description of Processing by Image Processing Apparatus)

Figure 8:
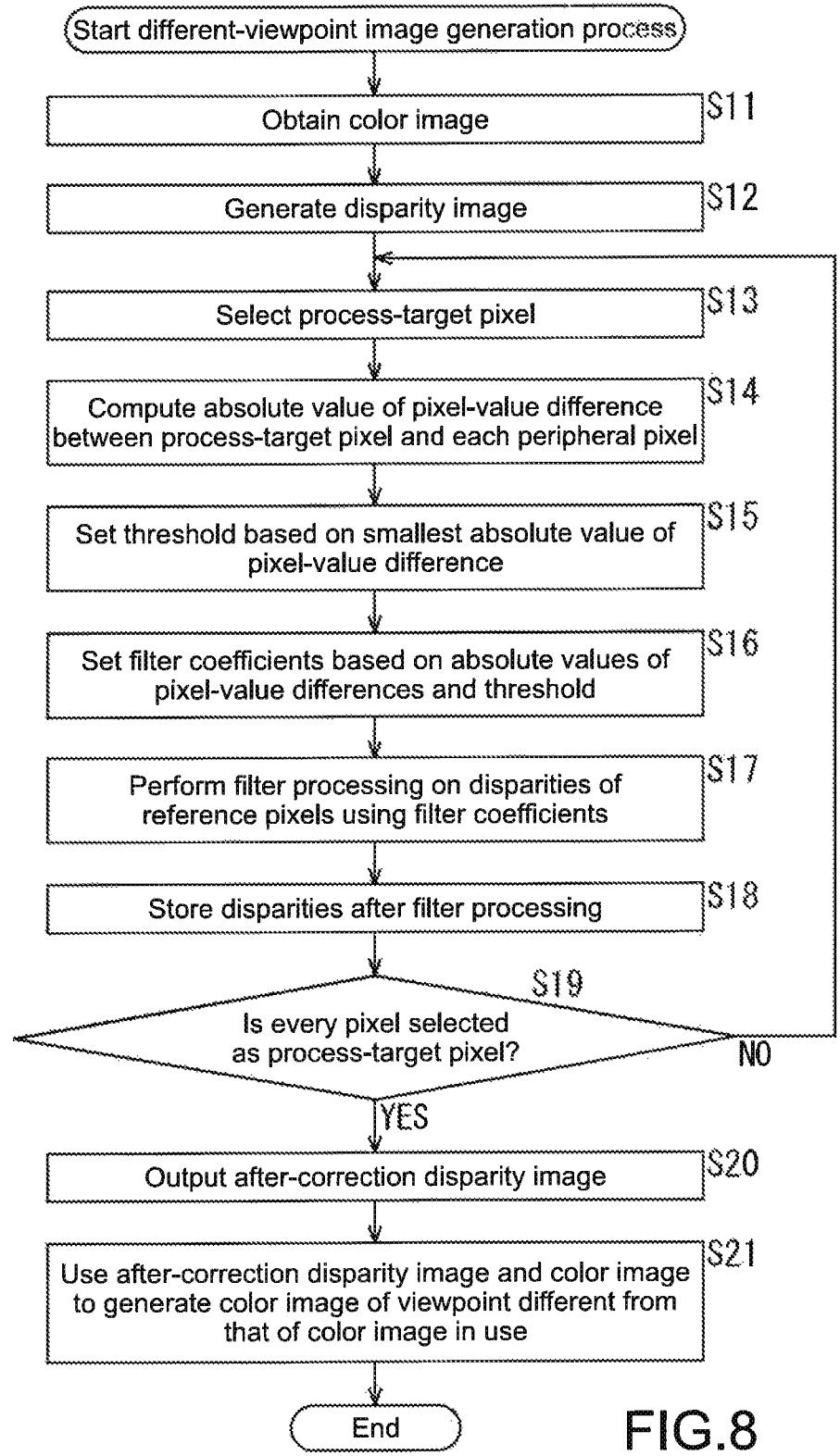
FIG. 8 is a flowchart of a different-viewpoint image generation process by the image processing apparatus in the first embodiment.

FIG. 8 is a flowchart of a different-viewpoint image generation process by the image processing apparatus 10. This different-viewpoint image generation process is started when a one-frame color image is input from the outside, for example.

In step S11 of FIG. 8, the image processing apparatus 10 obtains a one-frame color image from the outside. In step S12, using the obtained color image, the disparity detection section 11 in the image processing section 10 generates a disparity image of the color image.

In step S13, the difference computation section 31 in the asymmetric nonlinear filter 12 (FIG. 2) selects, as a process-target pixel, any pixel not yet selected as the process-target pixel in the color image.

In step S14, the difference computation section 31 computes the absolute value of a pixel-value difference between the process-target pixel and each peripheral pixel thereof. Among the computed absolute values of the pixel-value differences, the difference computation section 31 provides the threshold setting section 32 with the absolute values of the pixel-value differences between the process-target pixel and each of the pixels thereabove and therebelow. The difference computation section 31 provides the coefficient setting section 33 with the absolute value of a pixel-value difference between the process-target pixel and each reference pixel thereof.

In step S15, the threshold setting section 32 sets a threshold using Equation 1 above based on the absolute value of the pixel-value difference being the smallest among those provided by the difference computation section 31. The threshold is then supplied to the coefficient setting section 33.

In step S16, based both on the absolute values of the pixel-value differences provided by the difference computation section 31 and the threshold provided by the threshold setting section 32, the coefficient setting section 33 sets a filter coefficient for each of the reference pixels by Equation 2 above. The filter coefficients are then supplied to the processing section 34.

In step S17, using the filter coefficients provided by the coefficient setting section 33, the processing section 34 performs filter processing on disparities of the reference pixels in the disparity image provided by the disparity detection section 11 of FIG. 1. In step S18, the processing section 34 stores the disparities being the results of the filter processing.

In step S19, the difference computation section 31 determines whether every pixel in the color image is selected as a process-target pixel. When the determination in step S19 is made that not every pixel is yet selected as a process-target pixel, the procedure returns to step S13. The processes from steps S13 to S19 are repeated until every pixel is selected as a process-target pixel.

On the other hand, when the determination in step S19 is made that every pixel is selected as a process-target pixel, in step S20, the processing section 34 then provides the different-viewpoint image generation section 13 with an after-correction disparity image, which is a disparity image in which disparities of pixels in storage are all corrected.

In step S21, using both the after-correction disparity image provided by the asymmetric nonlinear filter 12 and the color image, the different-viewpoint image generation section 13 generates and outputs a color image of a viewpoint different from that of the color image in use. This is the end of the procedure.

As described above, the asymmetric nonlinear filter 12 sets filter coefficients based on the absolute values of pixel-value differences being correlation values in a color image, and using the filter coefficients, performs filter processing on a disparity image of the color image, thereby correcting the disparity image. With disparity correction as above, even if a disparity image to be generated using a color image is not precise enough, the precision of the disparity image is improved with phase synchronization established with the color image.

[Second Embodiment]

(Exemplary Configuration of Asymmetric Nonlinear Filter in Image Processing Apparatus in Second Embodiment)

An image processing apparatus in a second embodiment with the application of the present disclosure is similar to the image processing apparatus 10 of FIG. 1 except for the asymmetric nonlinear filter 12. Therefore, described in the below is only an asymmetric nonlinear filter.

Figure 9:
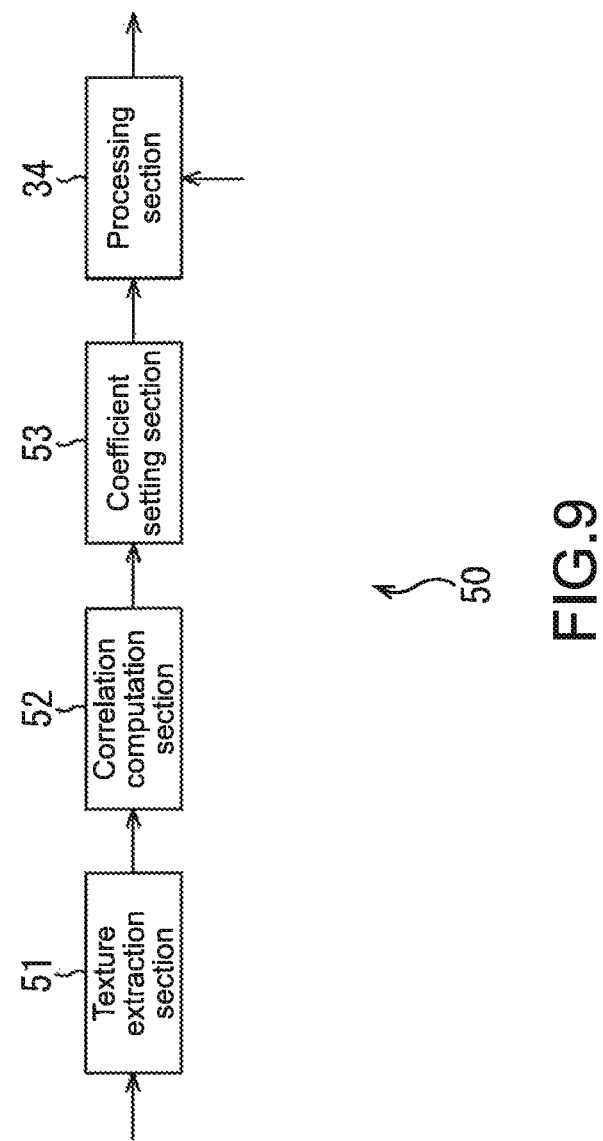
FIG. 9 is a block diagram showing an exemplary configuration of an asymmetric nonlinear filter in an image processing apparatus in a second embodiment with the application of the present disclosure.

FIG. 9 is a block diagram showing an exemplary configuration of an asymmetric nonlinear filter in the image processing apparatus in the second embodiment with the application of the present disclosure.

In the configuration of FIG. 9, any structure component similar to that of FIG. 2 is provided with the same reference numeral, and is not described again as appropriate if it is already described.

An asymmetric nonlinear filter 50 of FIG. 9 includes a texture extraction section 51, a correlation computation section 52, a coefficient setting section 53, and the processing section 34. The asymmetric nonlinear filter 50 sets filter coefficients not based on the absolute values of pixel-value differences but based on a similarity level of texture components.

To be specific, the texture extraction section 51 in the asymmetric nonlinear filter 50 extracts a texture component from a color image input from the outside, and supplies the texture component to the correlation computation section 52.

The correlation computation section 52 selects, one by one, a pixel in the color image as a process-target pixel. Based on the texture component provided by the texture extraction section 51, the correlation computation section 52 computes a correlation value of texture components between the process-target pixel and each reference pixel thereof. The obtained correlation values are used as those of the process-target pixel on the screen.

To be specific, the texture extraction section 51 computes a similarity level of texture components between the process-target pixel and each of the reference pixels. The texture extraction section 51 supplies the computed similarity levels to the coefficient setting section 53.

The coefficient setting section 53 uses the similarity levels provided by the texture extraction section 51 as a basis to set filter coefficients, i.e., the higher the similarity levels are (the more alike the texture components are), the larger the filter coefficients become. The filter coefficients are then provided to the processing section 34.

(Exemplary After-Correction Disparity Image)

FIGS. 10A to 10D are each a diagram showing an exemplary after-correction disparity image to be generated by the processing section 34 of FIG. 9.

Figure 10A:
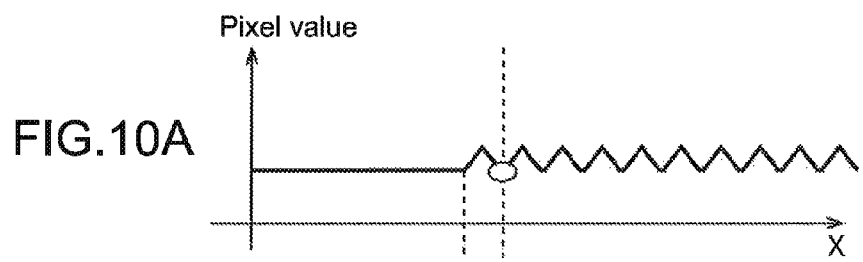
FIGS. 10A to 10D are each a diagram showing an exemplary after-correction disparity image to be generated by a processing section of FIG. 9.

In FIGS. 10A to 10D, the lateral axis represents a position (X) in the horizontal direction. In FIG. 10A, the vertical axis represents a pixel value, in FIG. 10B, the vertical axis represents a filter coefficient, and in FIGS. 10C and 10D, the vertical axis represents a disparity.

Figure 10B:
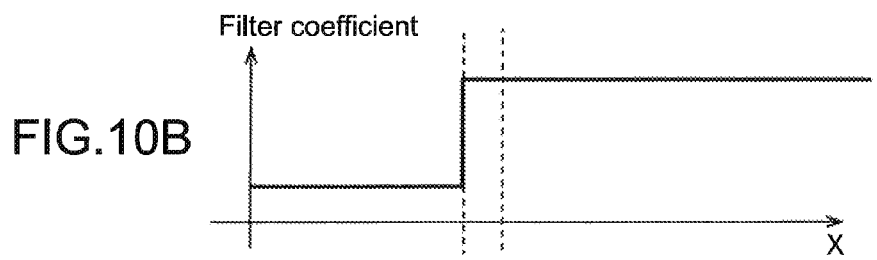
Figure 10C:
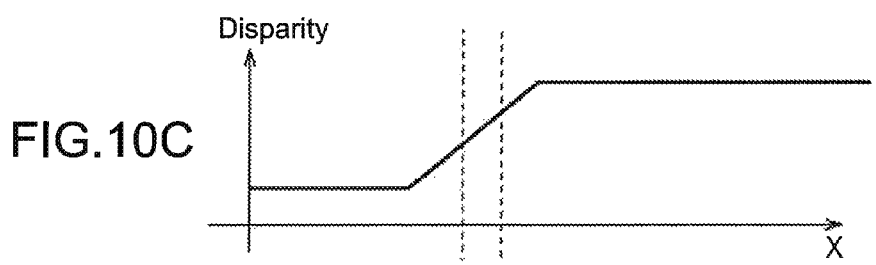

In the example of FIGS. 10A to 10D, a color image is as shown in FIG. 10A, and a before-correction disparity image is as shown in FIG. 10C. Herein, assuming that a pixel indicated by a circle in FIG. 10A is a process-target pixel, a filter coefficient for the process-target pixel is as shown in FIG. 10B.

That is, in the color image of FIG. 10A, a texture component shows a great change at a boundary between a pixel slightly on the left side of the process-target pixel (hereinafter, referred to as boundary pixel), and a pixel adjacent on the left side of the boundary pixel. Therefore, the boundary pixel and a pixel on the right side thereof each have a texture component similar to that of the process-target pixel. Accordingly, the process-target pixel takes the largest filter coefficient with respect to the boundary pixel being a reference pixel and the pixel also being a reference pixel on the right side thereof, and takes a small filter coefficient with respect to the pixel also being a reference pixel on the left side of the boundary pixel.

Figure 10D:
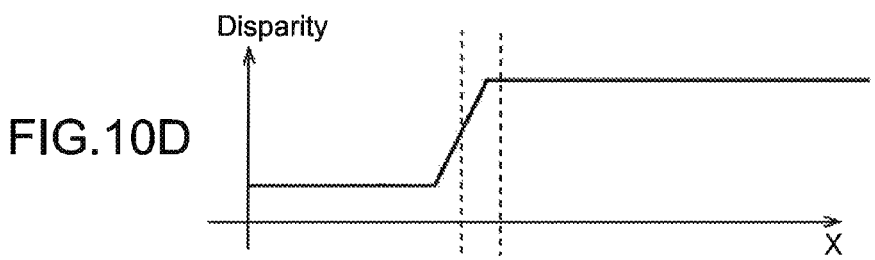

An after-correction disparity image done with filter processing using such filter coefficients is as shown in FIG. 10D. That is, a disparity of the pixel on the left side of the boundary pixel is corrected to be closer to a disparity of another pixel on the left side thereof, and a disparity of the pixel on the right side of the boundary pixel is corrected to be closer to a disparity of another pixel on the right side thereof. As a result, the disparity edge in the after-correction disparity image becomes steeper than that in the before-correction disparity image, thereby reducing more the phase difference between the color image and the disparity image.

(Description of Processing by Image Processing Apparatus)

Figure 11:
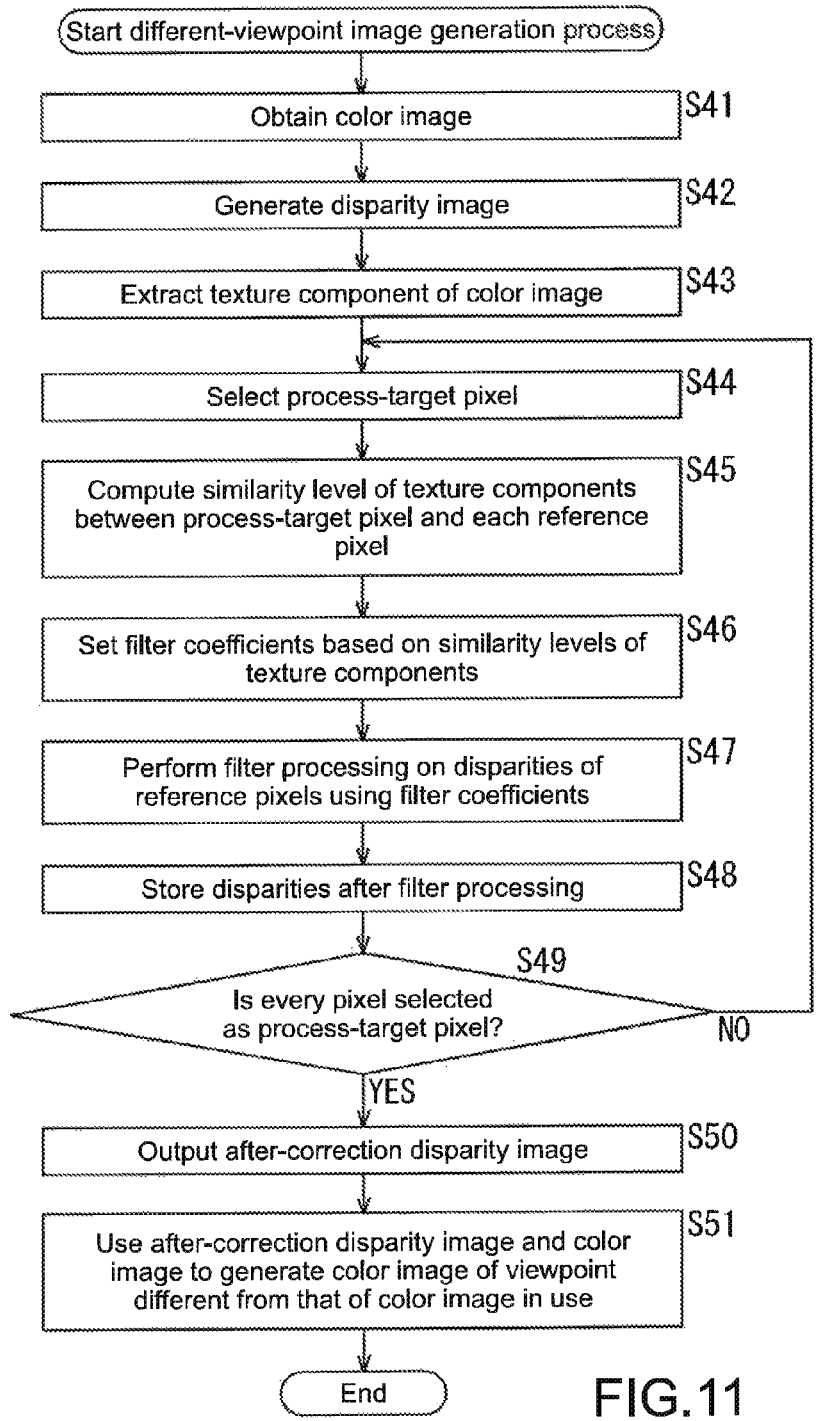
FIG. 11 is a flowchart of a different-viewpoint image generation process by the image processing apparatus in the second embodiment.

FIG. 11 is a flowchart of a different-viewpoint image generation process of the image processing apparatus in the second embodiment. This different-viewpoint image generation process is started when a one-frame color image is input from the outside, for example.

Processes in steps S41 and S42 of FIG. 11 are similar to those in steps S11 and S12 of FIG. 8, and thus are not described again.

In step S43, the texture extraction section 51 in the asymmetric nonlinear filter 50 (FIG. 9) extracts a texture component from the color image input from the outside, and supplies the texture component to the correlation computation section 52.

In step S44, the correlation computation section 52 selects, as a process-target pixel, any pixel not yet selected as the process-target pixel in the color image.

In step S45, the correlation computation section 52 computes a similarity level of texture components between the process-target pixel and each reference pixel thereof, and supplies the computed similarity levels to the coefficient setting section 53.

In step S46, based on the similarity levels of texture components provided by the correlation computation section 52, the coefficient setting section 53 sets a filter coefficient for each of the reference pixels, and supplies the filter coefficients to the processing section 34.

Processes in steps S47 to S51 are similar to those in steps S17 to S21 of FIG. 8, and thus are not described again.

As described above, the asymmetric nonlinear filter 50 sets filter coefficients based on the similarity levels of texture components in a color image, and using the filter coefficients, performs filter processing on a disparity image of the color image, thereby correcting the disparity image. With disparity correction as above, even if a disparity image to be generated using a color image is not precise enough, the precision of the disparity image is improved with phase synchronization established with the color image.

[Third Embodiment]

(Exemplary Configuration of Asymmetric Nonlinear Filter in Image Processing Apparatus in Third Embodiment)

An image processing apparatus in a third embodiment with the application of the present disclosure is similar to the image processing apparatus 10 of FIG. 1 except for the asymmetric nonlinear filter 12. Therefore, described in the below is only an asymmetric nonlinear filter.

Figure 12:
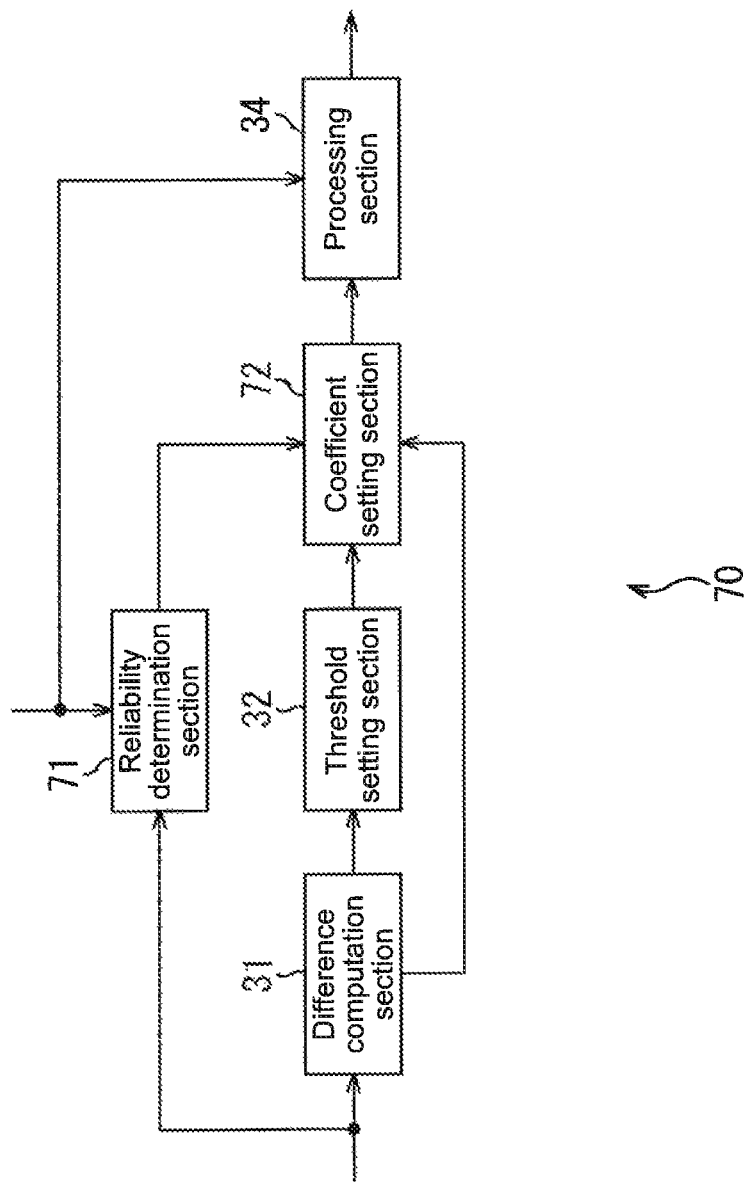
FIG. 12 is a block diagram showing an exemplary configuration of an asymmetric nonlinear filter in an image processing apparatus in a third embodiment with the application of the present disclosure.

FIG. 12 is a block diagram showing an exemplary configuration of an asymmetric nonlinear filter in the image processing apparatus in the third embodiment with the application of the present disclosure.

In the configuration of FIG. 12, any structure component similar to that of FIG. 2 is provided with the same reference numeral, and is not described again as appropriate if it is already described.

Compared with the configuration of the asymmetric nonlinear filter 12 of FIG. 2, an asymmetric nonlinear filter 70 of FIG. 12 is additionally provided with a reliability determination section 71, and includes a coefficient setting section 72 as an alternative to the coefficient setting section 33. The asymmetric nonlinear filter 70 determines a reliability level of disparity for each pixel, and as to any reference pixel whose reliability level is low, changes the filter coefficient therefor to 0.

To be specific, based both on a color image input from the outside and a disparity image provided by the disparity detection section 11 of FIG. 1, the reliability determination section 71 in the asymmetric nonlinear filter 70 determines a reliability level of disparity for each pixel in the color image.

As an example, the reliability detection section 71 extracts a face image from the color image. In the area of the face image, if there is any pixel whose disparity is smaller by a predetermined value or more compared with other pixels therearound, the reliability detection section 71 lowers the reliability level of disparity for the pixel. That is, because the face image is not greatly recessed in the depth direction, in the face image, any pixel whose disparity is smaller by a predetermined value or more compared with other pixels therearound is lowered in reliability level. The reliability determination section 71 supplies the determined reliability level to the coefficient setting section 72.

Similarly to the coefficient setting section 33 of FIG. 1, the coefficient setting section 72 sets a filter coefficient for each reference pixel based both on a threshold provided by the threshold setting section 32 and the absolute values of pixel-value differences provided by the difference computation section 31. Based on the reliability levels provided by the reliability determination section 71, as to any reference pixel whose reliability level is low, the coefficient setting section 72 changes the filter coefficient therefor to 0. The coefficient setting section 72 supplies the changed filter coefficient to the processing section 34.

(Exemplary After-Correction Disparity Image)

FIGS. 13A to 13D are each a diagram showing an exemplary after-correction disparity image to be generated by the processing section 34 of FIG. 12.

Figure 13:
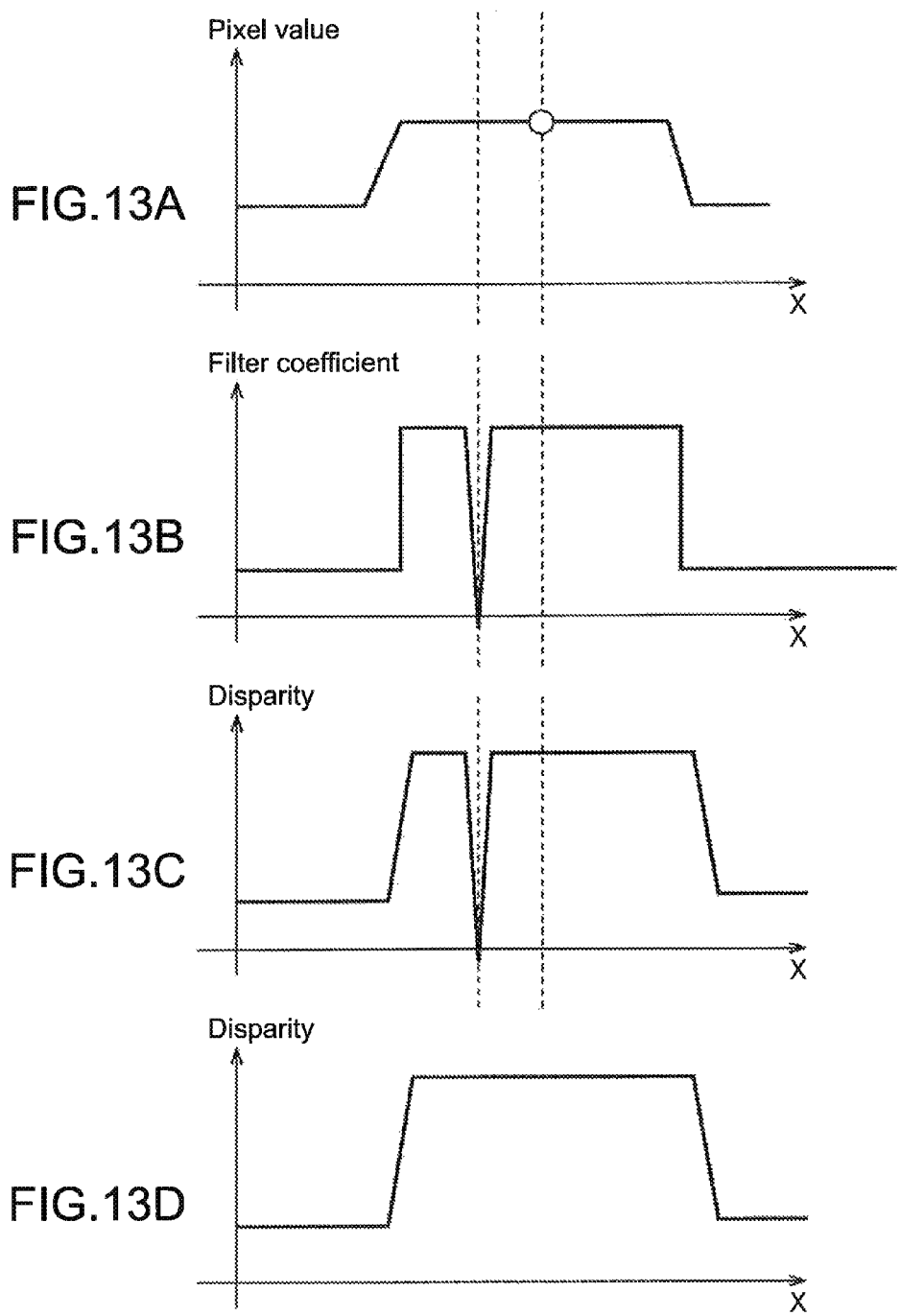
FIGS. 13A to 13D are each a diagram showing an exemplary after-correction disparity image to be generated by a processing section of FIG. 12.

In FIGS. 13A to 13D, the lateral axis represents a position (X) in the horizontal direction. In FIG. 13A, the vertical axis represents a pixel value, in FIG. 13B, the vertical axis represents a filter coefficient, and in FIGS. 13C and 13D, the vertical axis represents a disparity.

In the example of FIGS. 13A to 13D, a color image is as shown in FIG. 13A, and a before-correction disparity image is as shown in FIG. 13C. Herein, assuming that a pixel indicated by a circle in the area of a face image in FIG. 13A is a process-target pixel, a filter coefficient for the process-target pixel is as shown in FIG. 13B.

That is, in the color image of FIG. 13A, the area where pixels including the process-target pixel are fixed in value is the area of the face image. In the disparity image of FIG. 13C, one reference pixel in the area of the face image shows a disparity of 0, which is an extremely small value compared with others therearound. Therefore, filter coefficients for the reference pixels in the area of the face image are large except for a filter coefficient for the reference pixel with the disparity of 0 as shown in FIG. 13B, i.e., the filter coefficient therefor is changed to 0.

As a result, an after-correction disparity image done with filter processing using such filter coefficients is as shown in FIG. 13D. That is, the pixel in the area of the face image with the disparity of 0 is not used as a reference pixel for disparity correction of a process-target pixel, so that the pixels in the area of the face image all have the same disparity.

(Description of Processing by Image Processing Apparatus)

Figure 14:
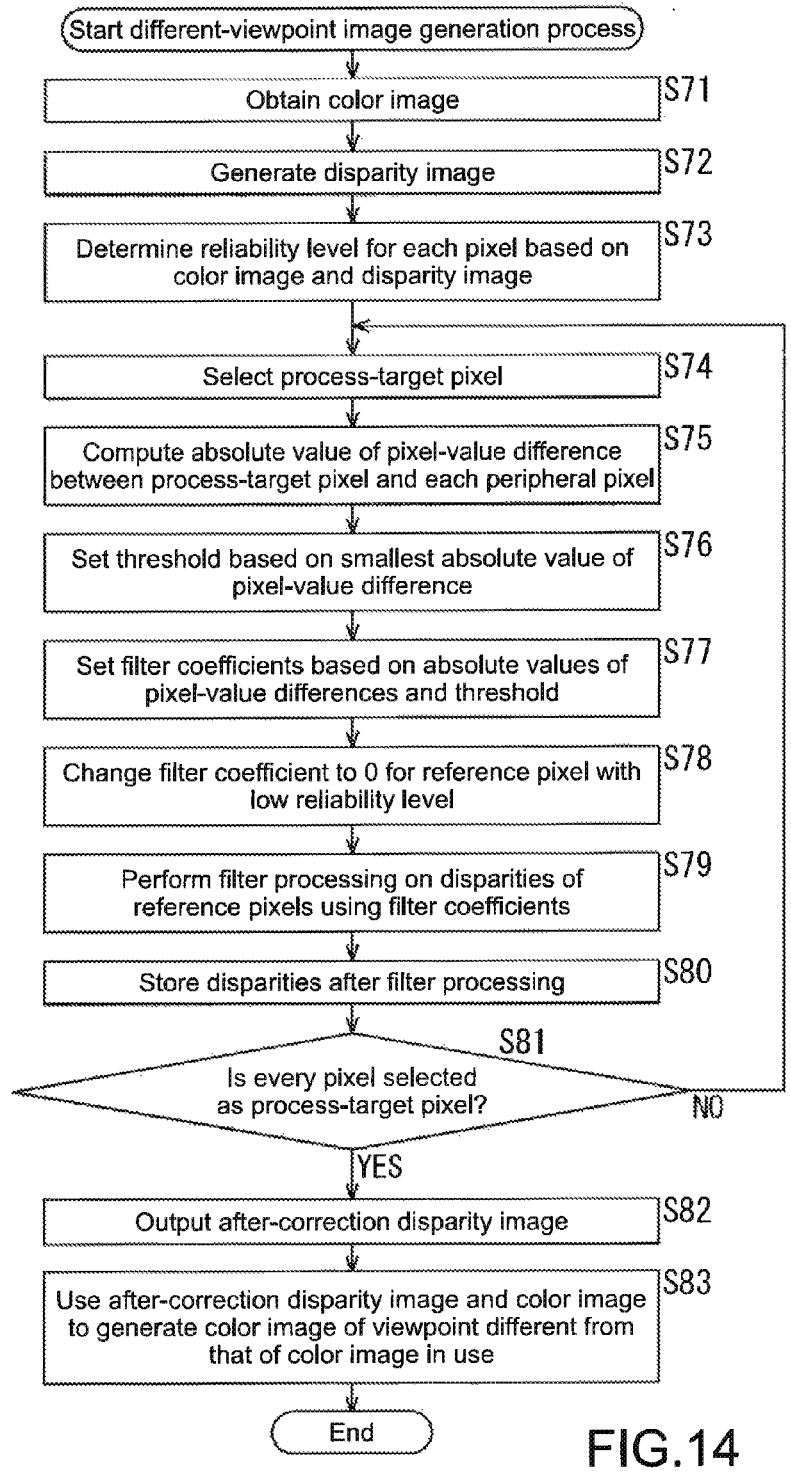
FIG. 14 is a flowchart of a different-viewpoint image generation process by the image processing apparatus in the third embodiment.

FIG. 14 is a flowchart of a different-viewpoint image generation process of the image processing apparatus in the third embodiment. This different-viewpoint image generation process is started when a one-frame color image is input from the outside, for example.

Processes in steps S71 and S72 of FIG. 14 are similar to those in steps S11 and S12 of FIG. 8, and thus are not described again.

In step S73, based both on the color image input from the outside and a disparity image provided by the disparity detection section 11 of FIG. 1, the reliability determination section 71 in the asymmetric nonlinear filter 70 (FIG. 12) determines a reliability level of disparity for each pixel in the color image. The reliability determination section 71 then supplies the determined reliability levels of disparity to the coefficient setting section 72.

Processes in steps S74 to S77 are similar to those in steps S13 to S16 of FIG. 8, and thus are not described again.

In step S78, based on the reliability levels of disparity provided by the reliability determination section 71, as to any reference pixel whose reliability level of disparity is low, the coefficient setting section 72 changes the filter coefficient therefor to 0. The coefficient setting section 72 supplies the changed filter coefficient to the processing section 34. Processes in steps S79 to S83 are similar to those in steps S17 to S21 of FIG. 8, and thus are not described again.

As described above, the asymmetric nonlinear filter 70 corrects filter coefficients based on the reliability levels of disparity. This accordingly allows correction of a disparity image with no influence of pixels whose reliability levels of disparity are low. With disparity correction as such, the resulting disparity image is with a higher degree of precision.

13

[Fourth Embodiment]
(Exemplary Configuration of Asymmetric Nonlinear Filter in Image Processing Apparatus in Fourth Embodiment)

An image processing apparatus in a fourth embodiment with the application of the present disclosure is similar to the image processing apparatus 10 of FIG. 1 except for the asymmetric nonlinear filter 12. Therefore, described in the below is only an asymmetric nonlinear filter.

Figure 15:
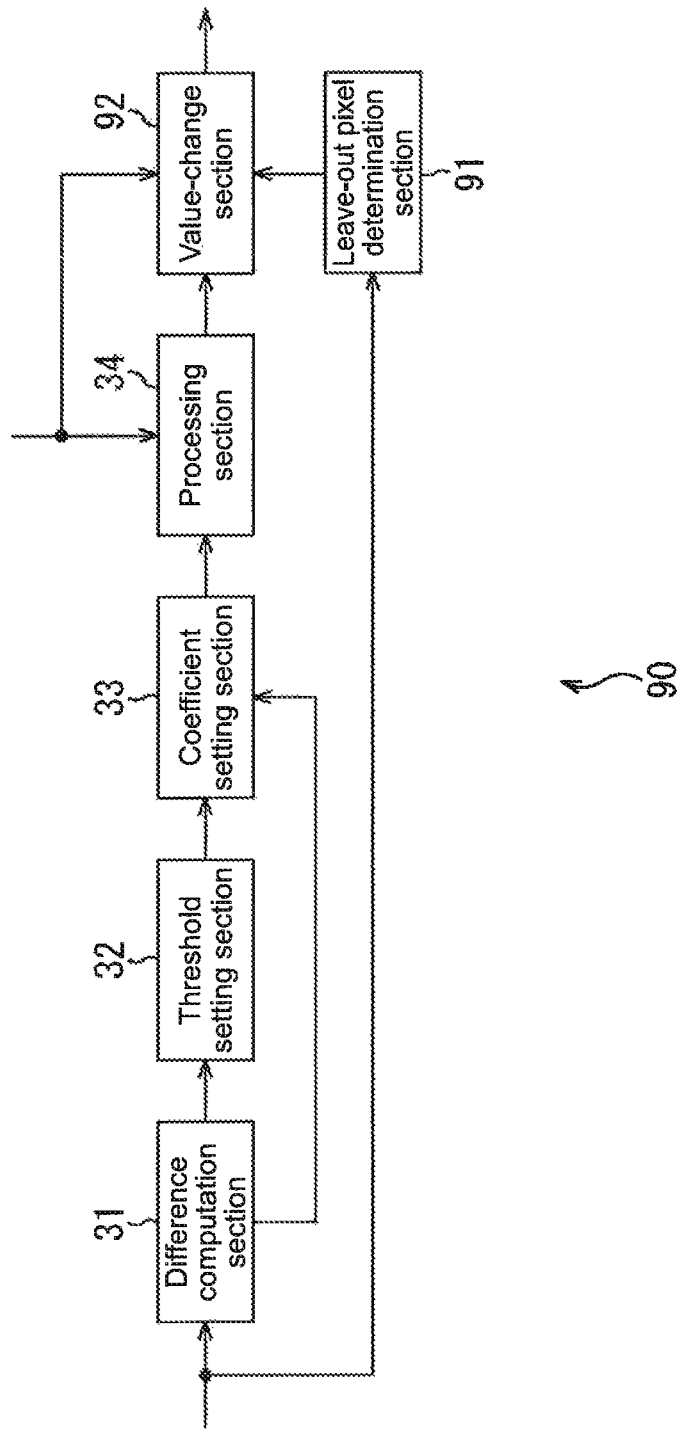
FIG. 15 is a block diagram showing an exemplary configuration of an asymmetric nonlinear filter in an image processing apparatus in a fourth embodiment with the application of the present disclosure.

FIG. 15 is a block diagram showing an exemplary configuration of an asymmetric nonlinear filter in the image processing apparatus in the fourth embodiment with the application of the present disclosure.

In the configuration of FIG. 15, any structure component similar to that of FIG. 2 is provided with the same reference numeral, and is not described again as appropriate if it is already described.

Compared with the configuration of the asymmetric nonlinear filter 12 of FIG. 2, an asymmetric nonlinear filter 90 of FIG. 15 is additionally provided with a leave-out pixel determination section 91 and a value-change section 92. The asymmetric nonlinear filter 90 selects any pixel not for filter processing as a leave-out pixel, and changes a disparity of the leave-out pixel to a predetermined value.

To be specific, based on a color image input from the outside, the leave-out pixel determination section 91 in the asymmetric nonlinear filter 90 selects any leave-out pixel from pixels in the color image. As an example, the leave-out pixel determination section 91 detects an area of vacant image from the color image, and determines pixels in the area as leave-out pixels. The leave-out pixel determination section 91 supplies information about which are the leave-out pixels, i.e., leave-out pixel information, to the value-change section 92.

Based on the leave-out pixel information, the value-change section 92 changes, to a predetermined value, disparities of leave-out pixels in an after-correction disparity image provided by the processing section 34. In this example, the leave-out pixels are those in a vacant image, and the predetermined value is the smallest value of disparity in a before-correction disparity image provided by the disparity detection section 11 of FIG. 1. The predetermined value is not restrictive, and may be a value of disparity set in advance.

(Description of Processing by Image Processing Apparatus)

Figure 16:
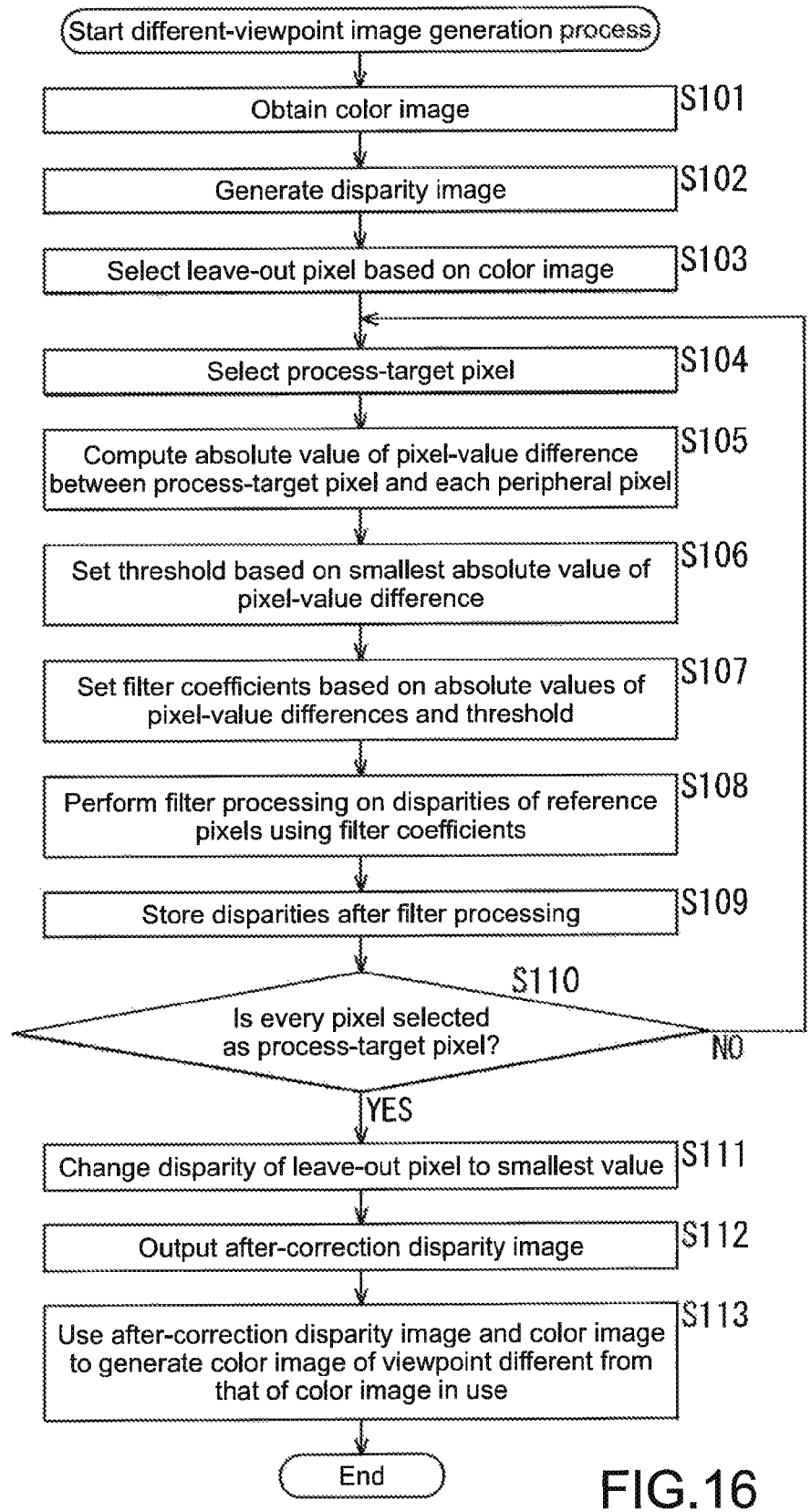
FIG. 16 is a flowchart of a different-viewpoint image generation process by the image processing apparatus in the fourth embodiment.

FIG. 16 is a flowchart of a different-viewpoint image generation process of the image processing apparatus in the fourth embodiment. This different-viewpoint image generation process is started when a one-frame color image is input from the outside, for example.

Processes in steps S101 and S102 of FIG. 16 are similar to those in steps S11 and S12 of FIG. 8, and thus are not described again.

In step S103, based on the color image input from the outside, the leave-out pixel determination section 91 in the asymmetric nonlinear filter 90 (FIG. 15) selects any leave-out pixel from pixels in the color image. The leave-out pixel determination section 91 then supplies leave-out pixel information to the value-change section 92.

Processes in steps S104 to S110 are similar to those in steps S13 to S19 of FIG. 8, and thus are not described again.

In step S111, based on the leave-out pixel information, the value-change section 92 changes disparities of leave-out pixels in an after-correction disparity image provided by the processing section 34 to the smallest value of disparity in a before-correction disparity image.

14

Processes in steps S112 and S113 are similar to those in steps S20 and S21 of FIG. 8, and thus are not described again.

As described above, the asymmetric nonlinear filter 90 uses leave-out pixel information to correct an after-correction disparity image. This accordingly prevents filter processing from erroneously correcting disparities of pixels that may be correctly estimated in advance. As a result, the resulting disparity image is with a higher degree of precision.

[Fifth Embodiment]
(Exemplary Configuration of Asymmetric Nonlinear Filter in Image Processing Apparatus in Fifth Embodiment)

An image processing apparatus in a fifth embodiment with the application of the present disclosure is similar to the image processing apparatus 10 of FIG. 1 except for the asymmetric nonlinear filter 12. Therefore, described in the below is only an asymmetric nonlinear filter.

Figure 17:
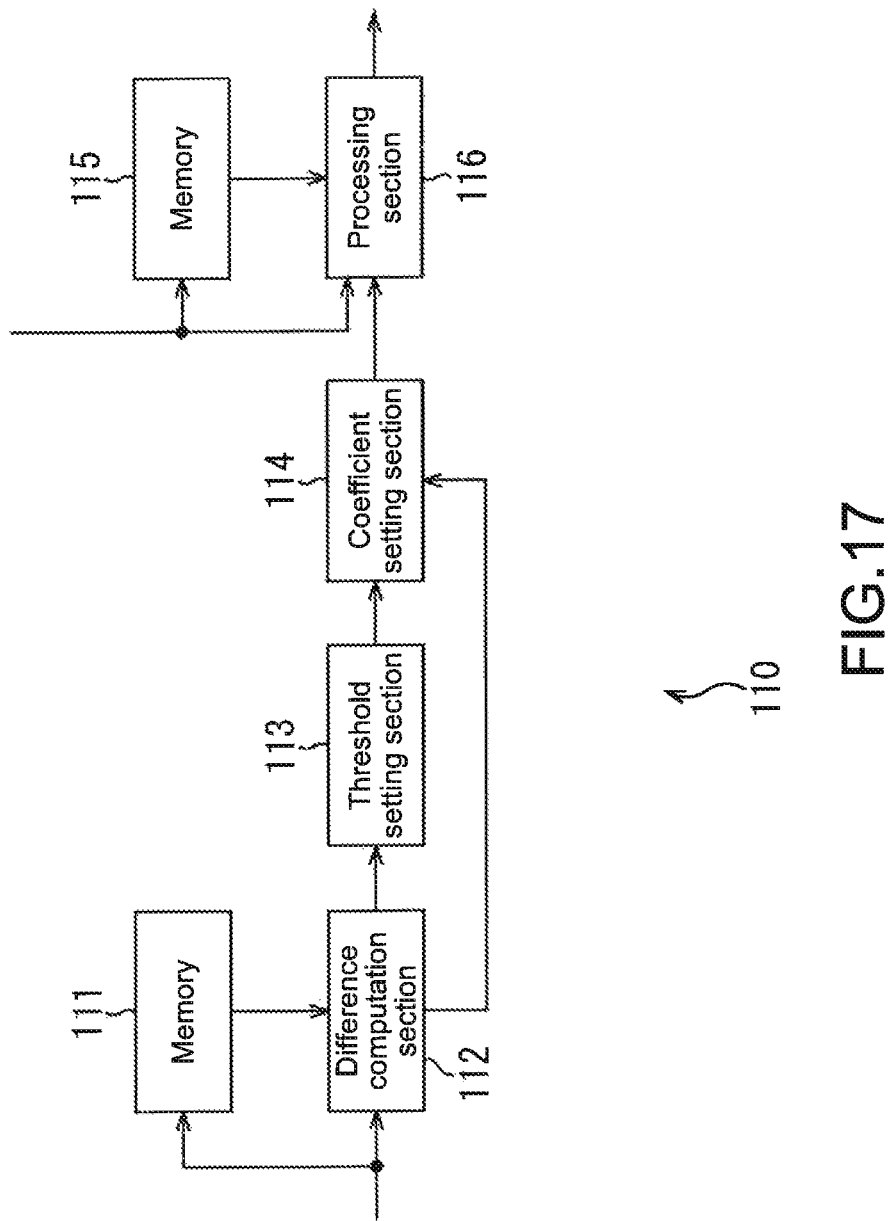
FIG. 17 is a block diagram showing an exemplary configuration of an asymmetric nonlinear filter in an image processing apparatus in a fifth embodiment with the application of the present disclosure.

FIG. 17 is a block diagram showing an exemplary configuration of an asymmetric nonlinear filter in the image processing apparatus in the fifth embodiment with the application of the present disclosure.

An asymmetric nonlinear filter 110 of FIG. 17 includes a memory 111, a difference computation section 112, a threshold setting section 113, a coefficient setting section 114, a memory 115, and a processing section 116. The asymmetric nonlinear filter 110 corrects a disparity image based not only on on-screen correlation values in a color image but also on screen-to-screen correlation values therein.

To be specific, the memory 111 in the asymmetric nonlinear filter 110 stores a color image input from the outside.

The difference computation section 112 reads a frame of the color image (hereinafter, the frame is referred to as previous frame), which is one frame before a frame of the color image currently input from the outside and stored in the memory 111 (hereinafter, the frame is referred to as current frame). The difference computation section 112 selects, one by one, a pixel in the current-frame color image as a process-target pixel.

The difference computation section 112 computes the absolute value of a pixel-value difference between each pair of pixels in the current-frame color image, i.e., between each one pixel selected as a process-target pixel and each one peripheral pixel thereof. The computed absolute values are used as on-screen correlation values of the process-target pixel. The difference computation section 112 also computes the absolute value of a pixel-value difference between each pair of pixels in the current- and previous-frame color images, i.e., between each one pixel selected as a process-target pixel in the current-frame color image and each one peripheral pixel thereof in the previous-frame color image. The computed absolute values are used as screen-to-screen correlation values of the process-target pixel.

Herein, the expression of "each one peripheral pixel in the previous-frame color image" denotes previous-frame reference pixels for use of filter processing on a process-target pixel, and pixels vertically aligned with a previous-frame pixel located at the same position as the process-target pixel in the current frame (hereinafter, this previous-frame pixel is referred to as previous-target pixel). The previous-frame reference pixels include pixels horizontally aligned with the previous-target pixel.

Among the computed absolute values of the pixel-value differences, the difference computation section 112 provides the threshold setting section 113 with the absolute values of the pixel-value differences between the process-target pixel and each of pixels thereabove and therebelow respectively in the current and previous frames. The difference computation section 112 also provides the coefficient setting section 114 with the absolute values of the pixel-value differences between the process-target pixel and each of its reference pixels respectively in the current and previous frames.

The threshold setting section 113 sets a threshold for each of the frames similarly to the threshold setting section 32 of FIG. 2. This threshold setting is made based on the absolute value of the pixel-value difference being the smallest among those provided by the difference computation section 112. The resulting thresholds are then supplied to the coefficient setting section 114.

The coefficient setting section 114 sets a filter coefficient for each of the current-frame reference pixels similarly to the coefficient setting section 33 of FIG. 2. This filter coefficient setting is made based both on the current-frame threshold provided by the threshold setting section 113, and the current-frame absolute value of the pixel-value difference provided by the difference computation section 112.

The coefficient setting section 114 also sets a filter coefficient for each of the previous-frame reference pixels similarly to the coefficient setting section 33. This coefficient setting is made based both on the previous-frame threshold provided by the threshold setting section 113, and the previous-frame absolute value of the pixel-value difference provided by the difference computation section 112. The coefficient setting section 114 then supplies the resulting filter coefficients to the processing section 116.

The memory 115 stores a disparity image provided by the disparity detection section 11 of FIG. 1.

Using the current-frame filter coefficients provided by the coefficient setting section 114, similarly to the processing section 34 of FIG. 2, the processing section 116 performs filter processing on disparities of reference pixels in a current-frame disparity image provided by the disparity detection section 11.

The processing section 116 reads a previous frame of the disparity image stored in the memory 115. Using the previous-frame filter coefficients provided by the coefficient setting section 114, the processing section 116 then performs filter processing on disparities of reference pixels in the previous-frame disparity image similarly to the processing section 34.

The processing section 116 calculates the average of disparity between the pixels in the current frame after the filter processing and the pixels in the previous frame after the filter processing. The average of disparity is used as an after-correction disparity of the process-target pixel. The processing section 116 then provides the different-viewpoint image generation section 13 of FIG. 1 with an after-correction disparity image, which is a disparity image in which disparities of pixels are all corrected.

(Exemplary After-Correction Disparity Image)

FIGS. 18A to 18I are each a diagram showing an exemplary after-correction disparity image to be generated by the processing section 116 of FIG. 17.

In FIGS. 18A to 18I, the lateral axis represents a position (X) in the horizontal direction. In FIGS. 18A and 18E, the vertical axis represents a pixel value, in FIGS. 18B and 18F, the vertical axis represents a filter coefficient, and in FIGS. 18C, 18D, and 18G to 18I, the vertical axis represents a disparity.

In the example of FIGS. 18A to 18I, a previous-frame color image is as shown in FIG. 18A, and as shown in FIG. 18E, a current-frame color image is the same as the previous-frame color image. As shown in FIG. 18C, a before-correction previous-frame disparity image shows a great change of disparity, but as shown in FIG. 18G, in a before-correction current-frame disparity image, a disparity remains the same.

Herein, assuming that a pixel indicated by a circle in FIG. 18E is a process-target pixel, a current-frame filter coefficient for the process-target pixel is as shown in FIG. 18F.

That is, in the color image of FIG. 18E, a pixel value shows a great change at a boundary between a boundary pixel slightly on the left side of the process-target pixel, and a pixel adjacent on the left side of the boundary pixel. Therefore, the boundary pixel and a pixel on the right side thereof each have a value similar to that of the process-target pixel. Accordingly, the process-target pixel takes the largest filter coefficient with respect to the boundary pixel being a reference pixel and the pixel also being a reference pixel on the right side thereof, and takes a small filter coefficient with respect to the pixel also being a reference pixel on the left side of the boundary pixel.

As shown in FIGS. 18A and 18E, the current-frame color image and the previous-frame color image are the same. Therefore, as shown in FIG. 18B, a previous-frame filter coefficient for the process-target pixel is the same as a current-frame filter coefficient therefor in FIG. 18F.

Accordingly, an after-correction current-frame disparity image done with filter processing using such filter coefficients is as shown in FIG. 18H. That is, the filter processing is performed using not only the current-frame disparity image in which the disparity remains the same but also the previous-frame disparity image. As a result, in the after-correction current-frame disparity image, the boundary pixel and the pixel on the right side thereof have disparities larger than that of the pixel on the left side of the boundary pixel. It means that the phase synchronization is established between the color image and the disparity image.

On the other hand, as exemplarily shown in FIG. 18D, the previous-frame disparity image shows a steeper disparity edge than that in the before-correction disparity image in FIG. 18C so that disparity correction is made to reduce the phase difference with the color image. In the after-correction disparity image, there thus is no abrupt change of disparity between the previous and current frames, thereby achieving temporal stability therein.

On the other hand, because the disparity remains the same in the before-correction current-frame disparity image, when the previous-frame disparity image is not used for filter processing, as shown in FIG. 18I, the disparity remains the same also in the current-frame disparity image after the filter processing. In this case, the after-correction disparity image shows an abrupt change of disparity between the previous and current frames.

(Description of Processing by Image Processing Apparatus)

Figure 19:
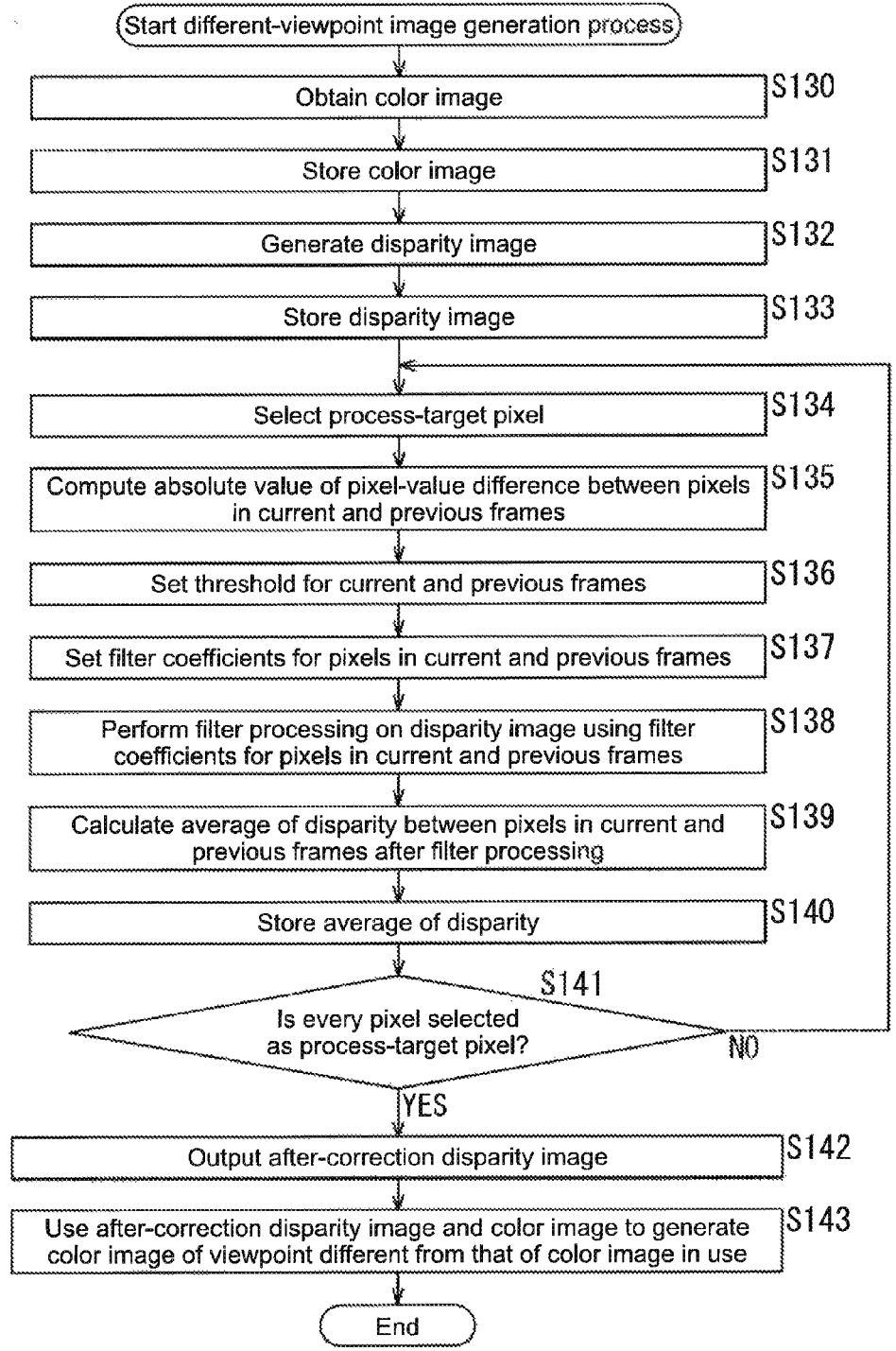
FIG. 19 is a flowchart of a different-viewpoint image generation process by the image processing apparatus in the fifth embodiment.

FIG. 19 is a flowchart of a different-viewpoint image generation process of the image processing apparatus in the fifth embodiment. This different-viewpoint image generation process is started when a one-frame color image is input from the outside, for example.

In step S130 of FIG. 19, similarly to the process in step S11 of FIG. 8, a one-frame color image is obtained from the outside. In step S131, the memory 111 in the asymmetric nonlinear filter 110 (FIG. 17) stores the obtained color image.

In step S132, using the obtained color image, the disparity detection section 11 generates a disparity image of the color image, and then supplies the disparity image to the asymmetric nonlinear filter 110. In step S133, the memory 115 stores a disparity image provided by the disparity detection section 11.

In step S134, the difference computation section 112 selects, as a process-target pixel, any pixel not yet selected as the process-target pixel in a current-frame color image.

In step S135, the difference computation section 112 reads a previous frame of the color image from the memory 111, and computes the absolute value of a pixel-value difference between the process-target pixel and each peripheral pixel thereof respectively in the current and previous frames.

Among the computed absolute values of the pixel-value differences, the difference computation section 112 provides the threshold setting section 113 with the absolute values of the pixel-value differences between the process-target pixel and each of its peripheral pixels thereabove and therebelow respectively in the current and previous frames. The difference computation section 112 also provides the coefficient setting section 114 with the absolute values of the pixel-value differences between the process-target pixel and each reference pixel thereof respectively in the current and previous frames.

In step S136, the threshold setting section 113 sets a threshold for each of the current and previous frames, and supplies the thresholds to the coefficient setting section 114. This threshold setting is made based on the absolute value of the pixel-value difference being the smallest among those provided by the difference computation section 112.

In step S137, the coefficient setting section 114 sets a filter coefficient for each pixel in the current and previous frames, and supplies the filter coefficients to the processing section 116. This filter coefficient setting is made based both on the absolute values of the pixel-value differences provided by the difference computation section 112, and the thresholds provided by the threshold setting section 113.

In step S138, the processing section 116 reads a previous frame of the disparity image from the memory 115, and performs filter processing on disparities of reference pixels for the previous-frame disparity image and a current-frame disparity image using the filter coefficients provided by the coefficient setting section 114.

In step S139, the processing section 116 calculates the average of disparity between the pixels in the current frame and the pixels in the previous frame after the filter processing. In step S140, the processing section 116 stores the average of disparity as an after-correction disparity.

Processes in steps S141 to S143 are similar to those in steps S19 to S21 of FIG. 8, and thus are not described again.

As described above, the asymmetric nonlinear filter 110 sets filter coefficients based on on-screen and screen-to-screen correlation values in a color image(s), and using the filter coefficients, performs filter processing on current- and previous-frame disparity images. The asymmetric nonlinear filter 110 then calculates the average of disparity, thereby obtaining a corrected disparity image. This allows generation of a disparity image with a high degree of precision and with temporal stability.

[Sixth Embodiment]
(Exemplary Configuration of Asymmetric Nonlinear Filter in Image Processing Apparatus in Sixth Embodiment)

An image processing apparatus in a sixth embodiment with the application of the present disclosure is similar to the image processing apparatus 10 of FIG. 1 except for the asymmetric nonlinear filter 12. Therefore, described in the below is only an asymmetric nonlinear filter.

Figure 20:
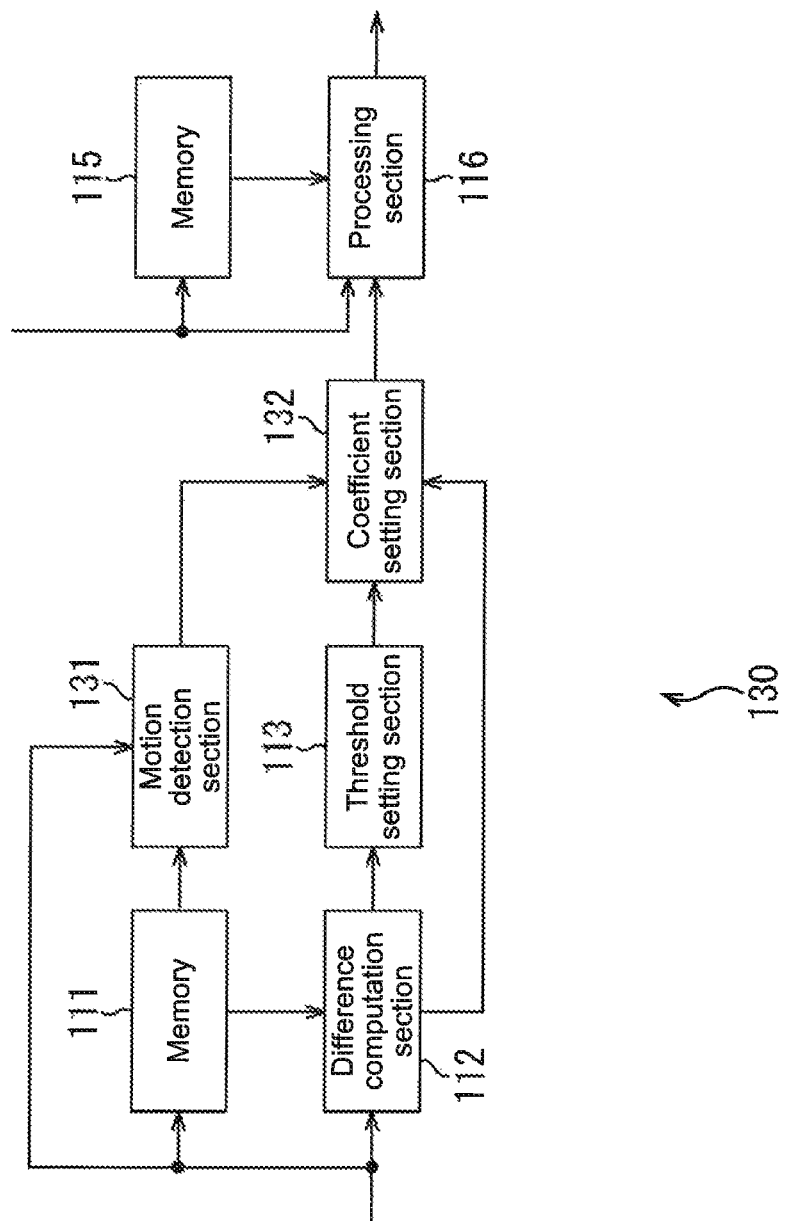
FIG. 20 is a block diagram showing an exemplary configuration of an asymmetric nonlinear filter in an image processing apparatus in a sixth embodiment with the application of the present disclosure.

FIG. 20 is a block diagram showing an exemplary configuration of an asymmetric nonlinear filter in the image processing apparatus in the sixth embodiment with the application of the present disclosure.

In the configuration of FIG. 20, any structure component similar to that of FIG. 17 is provided with the same reference numeral, and is not described again as appropriate if it is already described.

Compared with the configuration of the asymmetric nonlinear filter 110 of FIG. 17, an asymmetric nonlinear filter 130 of FIG. 20 is additionally provided with a motion detection section 131, and includes a coefficient setting section 132 as an alternative to the coefficient setting section 114. The asymmetric nonlinear filter 130 corrects filter coefficients based on motion vectors in a color image, and using the corrected filter coefficients, corrects a disparity image.

To be specific, the motion detection section 131 in the asymmetric nonlinear filter 130 reads a previous-frame color image stored in the memory 111. Using both a current-frame color image input from the outside and the previous-frame color image, the motion detection section 131 detects a motion vector of each pixel in the current-frame color image. The motion detection section 131 then supplies the detected motion vectors to the coefficient setting section 132.

Similarly to the coefficient setting section 114 of FIG. 17, the coefficient setting section 132 sets filter coefficient for each pixel respectively in the current and previous frames. The coefficient setting section 132 uses the motion vector of a process-target pixel provided by the motion detection section 131 to correct the filter coefficients, and then supplies the filter coefficients to the processing section 116.

(Exemplary After-Correction Disparity Image)

FIGS. 21A to 21H are each a diagram showing an exemplary disparity image corrected using before-correction filter coefficients, and FIGS. 22A to 22D are each a diagram showing an exemplarily after-correction disparity image to be generated by the processing section 116 of FIG. 20.

In FIGS. 21A to 22D, the lateral axis represents a position (X) in the horizontal direction. In FIGS. 21A and 21E, the vertical axis represents a pixel value, in FIGS. 21B, 21D, 21F, 21H, 22B, and 22D, the vertical axis represents a disparity. In FIGS. 21C, 21G, 22A, and 22C, the vertical axis represents a filter coefficient.

In the example of FIGS. 21A to 21H, a previous-frame color image is as shown in FIG. 21A, and as shown in FIG. 21E, a current-frame color image includes a dotted-rectangular area 141 moved toward the right compared with that in FIG. 21A. Such movement of the area 141 causes motion blur at the boundary of the area 141, thereby sometimes causing edge blur as shown in FIGS. 21A and 21E.

If this is the case, such edge blur is observed also in a before-correction previous-frame disparity image of FIG. 21B, and in a before-correction current-frame disparity image of FIG. 21F.

Herein, assuming that a pixel indicated by a circle in FIG. 21E is a process-target pixel, a before-correction filter coefficient for the process-target pixel in the current-frame disparity image is as shown in FIG. 21G. That is, as shown in FIG. 21G, a filter coefficient for the process-target pixel takes the largest value, and a filter coefficient for each reference pixel is reduced as the reference pixel is away from the process-target pixel, and then reaches a fixed value.

As shown in FIGS. 21A and 21E, the previous-frame color image includes the area 141 moved toward the left compared with that in the current-frame color image. Therefore, the filter coefficient for the process-target pixel in the previous-frame disparity image takes the form as shown in FIG. 21C, i.e., the form in which the filter coefficients for pixels in the area 141 of FIG. 21G are moved toward the left.

Accordingly, the after-correction current-frame disparity image done with filter processing using such filter coefficients is as shown in FIG. 21H. That is, the current-frame disparity image is so corrected as to have the steeper disparity edge. Moreover, because the previous-frame disparity image is corrected similarly to the current-frame disparity image, as exemplarily shown in FIG. 21D, disparities of the pixels in the area 141 in the after-correction current-frame disparity image of FIG. 21H are moved toward the left.

Figure 22A:
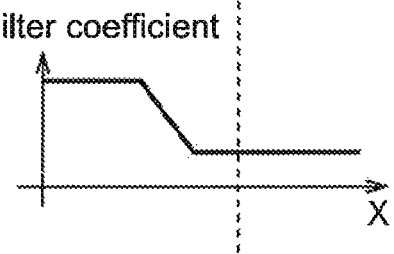
FIGS. 22A to 22D are each a diagram showing an exemplary after-correction disparity image to be generated by a processing section of FIG. 20.
Figure 22B:
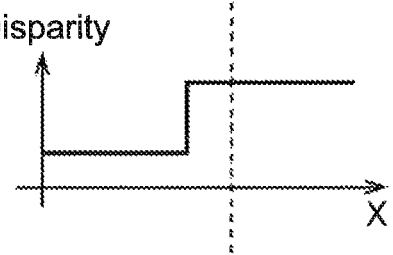
Figure 22C:
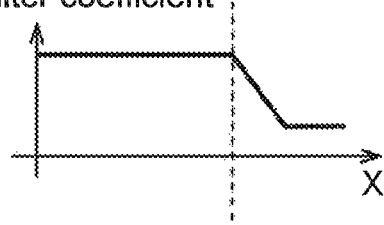
Figure 22D:
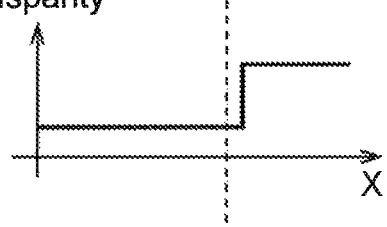

On the other hand, when the filter coefficients are corrected based on the motion vectors, an after-correction filter coefficient for the process-target pixel in the current-frame disparity image is as shown in FIG. 22C. That is, because the current-frame color image includes the area 141 moved toward the right compared with that in the previous-frame color image, the motion vectors are pointing to the right. Therefore, the before-correction filter coefficients of FIG. 21G are so corrected as to increase the filter coefficients for reference pixels whose vectors are pointing to the left, i.e., in the direction opposite to the motion vector of the process-target pixel.

The filter coefficient for the process-target pixel in the previous-frame disparity image is corrected based on the motion vector thereof similarly to the case with the current-frame disparity image, and the after-correction filter coefficients are as shown in FIG. 22A. That is, the filter coefficients of FIG. 21C based on the before-correction correlation values are so corrected as to increase the filter coefficient for the reference pixel corresponding to the process-target pixel, i.e., the reference pixel on the left side of the reference pixel whose filter coefficient is the largest.

The after-correction current-frame disparity image done with filter processing using the filter coefficients corrected as above is as shown in FIG. 21D. That is, in the after-correction current-frame disparity image, the disparity of the process-target pixel becomes smaller, and the disparity edge therein becomes steeper than that in the disparity image of FIG. 21H. Moreover, because the previous-frame disparity image is corrected similarly to the current-frame disparity image, as shown in FIG. 22B, the disparity edge therein is steeper than that in FIG. 21D.

(Description of Processing by Image Processing Apparatus)

Figure 23:
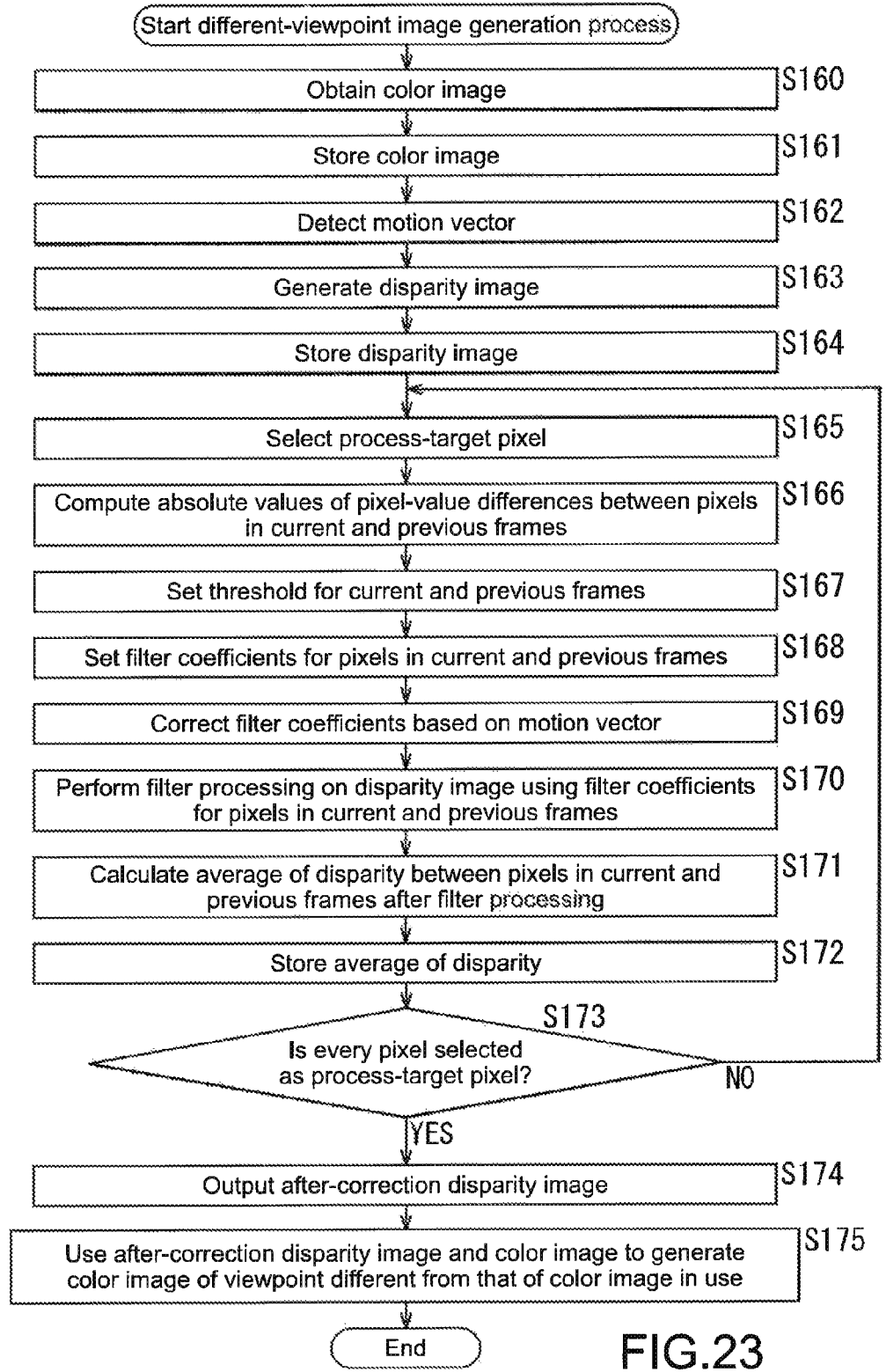
FIG. 23 is a flowchart of a different-viewpoint image generation process by the image processing apparatus in the sixth embodiment.

FIG. 23 is a flowchart of a different-viewpoint image generation process of the image processing apparatus in the sixth embodiment. This different-viewpoint image generation process is started when a one-frame color image is input from the outside, for example.

Processes in steps S160 and S161 of FIG. 23 are similar to those in steps S130 and S131 of FIG. 19, and thus are not described again.

In step S162, the motion detection section 131 reads a previous-frame color image from the memory ill, and based on the previous-frame color image and a current-frame color image, detects a motion vector of each pixel in the respective color images. The motion detection section 131 then supplies the detected motion vectors to the coefficient setting section 132.

Processes in steps S163 to S168 are similar to those in steps S132 to S137 of FIG. 19, and thus are not described again.

In step S169, based on the motion vector of a process-target pixel provided by the motion detection section 131, the coefficient setting section 132 corrects a filter coefficient set for each of the pixels in the current and previous images. The corrected filter coefficients are then provided to the processing section 116.

Processes in steps S170 to S175 are similar to those in steps S138 to S143 of FIG. 19, and thus are not described again.

As described above, the asymmetric nonlinear filter 130 corrects filter coefficients based on motion vectors, so that the resulting disparity image is with a higher degree of precision and with a steeper disparity edge.

In the sixth embodiment, motion vectors are used as a basis to correct filter coefficients. Alternatively, the motion vectors may be used as a basis to correct correlation values. Still alternatively, the asymmetric nonlinear filter 130 may correct the filter coefficients based on the motion vectors in the entire screen.

[Seventh Embodiment]

(Exemplary Configuration of Asymmetric Nonlinear Filter in Image Processing Apparatus in Seventh Embodiment)

An image processing apparatus in a seventh embodiment with the application of the present disclosure is similar to the image processing apparatus 10 of FIG. 1 except for the asymmetric nonlinear filter 12. Therefore, described in the below is only an asymmetric nonlinear filter.

Figure 24:
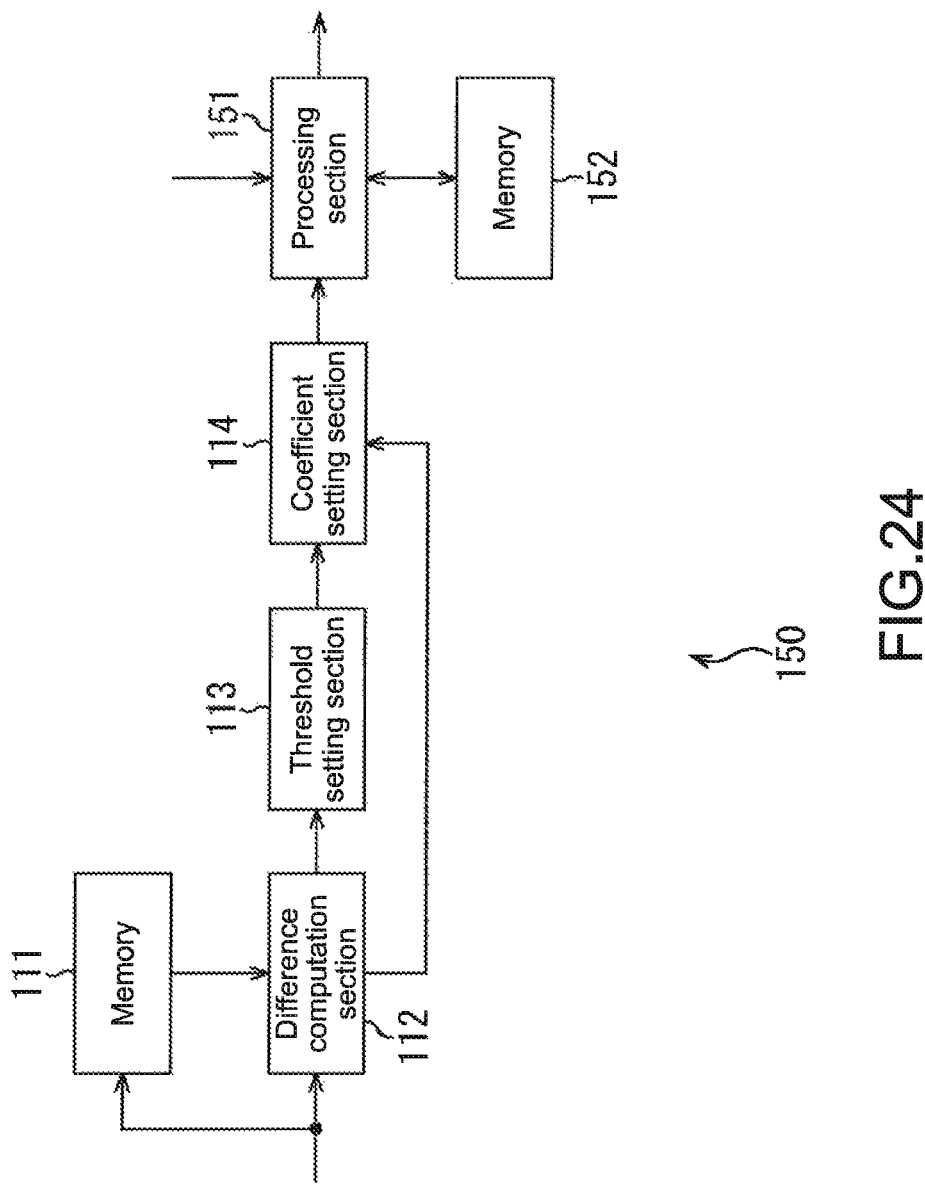
FIG. 24 is a block diagram showing an exemplary configuration of an asymmetric nonlinear filter in an image processing apparatus in a seventh embodiment with the application of the present disclosure.

FIG. 24 is a block diagram showing an exemplary configuration of an asymmetric nonlinear filter in the image processing apparatus in the seventh embodiment with the application of the present disclosure.

In the configuration of FIG. 24, any structure component similar to that of FIG. 17 is provided with the same reference numeral, and is not described again as appropriate if it is already described.

Compared with the configuration of the asymmetric nonlinear filter 110 of FIG. 17, an asymmetric nonlinear filter 150 of FIG. 24 includes a processing section 151 as an alternative to the processing section 116, and a memory 152 as an alternative to the memory 115. The asymmetric nonlinear filter 150 uses an after-correction previous-frame disparity image to correct a current-frame disparity image.

To be specific, similarly to the processing section 116 of FIG. 17, using filter coefficients for pixels in the current frame provided by the coefficient setting section 132, the processing section 151 in the asymmetric nonlinear filter 150 performs filter processing on disparities of reference pixels in the current-frame disparity image provided by the disparity detection section 11.

The processing section 151 reads an after-correction previous-frame disparity image stored in the memory 152. Using the filter coefficients for pixels in the previous frame provided by the coefficient setting section 114, the processing section 151 then performs filter processing on disparities of reference pixels in the after-correction previous-frame disparity image.

Using an IIR (Infinite Impulse Response) filter or others, the processing section 151 calculates the average of disparity between the pixels in the current frame after the filter processing and the pixels in the previous frame after the filter processing. The resulting average of disparity is used as an after-correction disparity. The processing section 151 then provides both the different-viewpoint image generation section 13 of FIG. 1 and the memory 152 with an after-correction disparity image, which is a disparity image in which disparities of pixels are all corrected.

The memory 152 stores the after-correction disparity image provided by the processing section 151.

(Exemplary After-Correction Disparity Image)

FIGS. 25A to 25E are each a diagram showing an exemplary after-correction disparity image to be generated by the processing section 151 of FIG. 24.

Figure 25A:
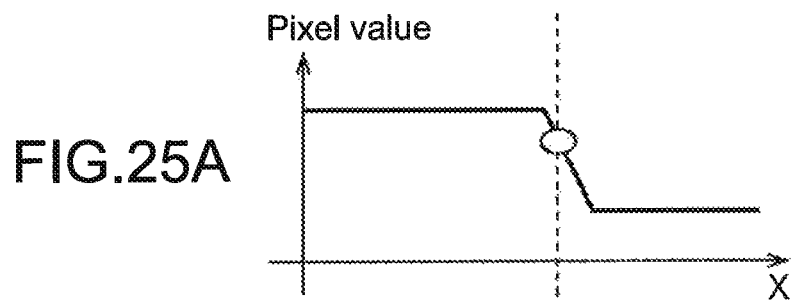
FIGS. 25A to 25E are each a diagram showing an exemplary after-correction disparity image to be generated by a processing section of FIG. 24.

In FIGS. 25A to 25E, the lateral axis represents a position (X) in the horizontal direction. In FIG. 25A, the vertical axis represents a pixel value, in FIGS. 25B, 25D, and 25E, the vertical axis represents a disparity, and in FIG. 25C, the vertical axis represents a filter coefficient.

Figure 25B:
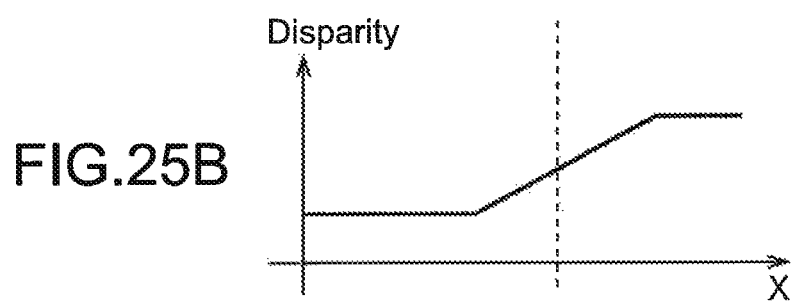

In the example of FIGS. 25A to 25E, a current-frame color image is as shown in FIG. 25A, and a before-correction current-frame disparity image is as shown in FIG. 25B.

Figure 25C:
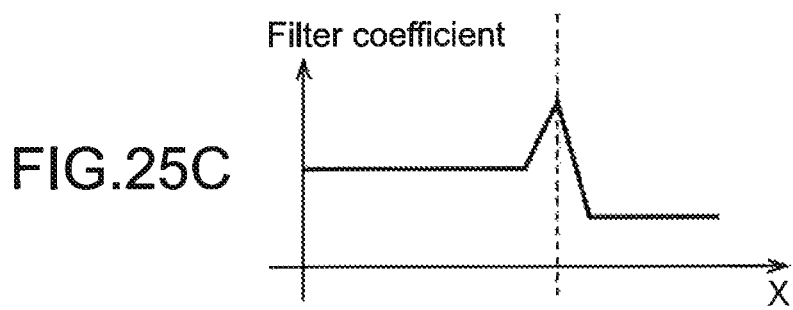

Herein, assuming that a pixel indicated by a circle in FIG. 25A is a process-target pixel, a filter coefficient for the process-target pixel in the current frame is as shown in FIG. 25C. That is, as shown in FIG. 25C, the filter coefficient for the process-target pixel takes the largest value, and a filter coefficient for each reference pixel is reduced as the reference pixel is away from the process-target pixel, and then reaches a fixed value.

Note that, as shown in FIG. 25A, the process-target pixel takes a value closer to pixels being large in value on the left side thereof than to pixels being small in value on the right side thereof. Therefore, the filter coefficient fixed in value for reference pixels on the left side of the process-target pixel is larger than the filter coefficient fixed in value for reference pixels on the right side thereof. Although not shown, the filter coefficients in the previous frame are set also based on the previous-frame color image.

Figure 25D:
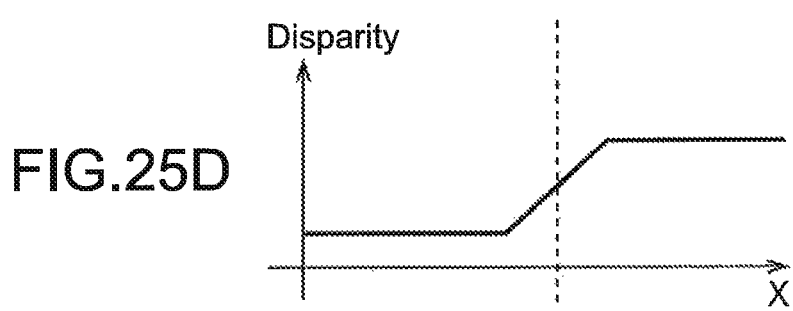

Using the filter coefficients for the pixels in the current and previous frames as above, filter processing is performed on before-correction current- and previous-frame disparity images. The resulting after-correction current-frame disparity image is as shown in FIG. 25D, for example. That is, the current-frame disparity image is so corrected as to have the steeper disparity edge therein.

Figure 25E:
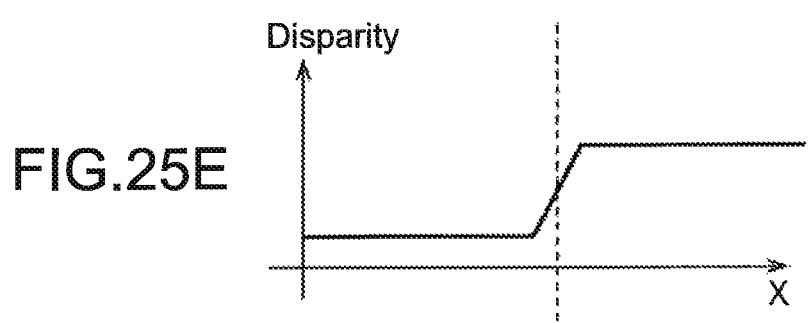

For correcting a next-frame disparity image subsequent to the current-frame disparity image using the current-frame disparity image corrected as above as a previous-frame disparity image, when a next-frame color image shows no change, the resulting disparity image after the correction is as shown in FIG. 25E, for example. That is, as is corrected using the disparity image corrected to have the steeper disparity edge, the resulting disparity image has a steeper disparity edge than that in the after-correction current-frame disparity image of FIG. 25D.

(Description of Processing by Image Processing Apparatus)

Figure 26:
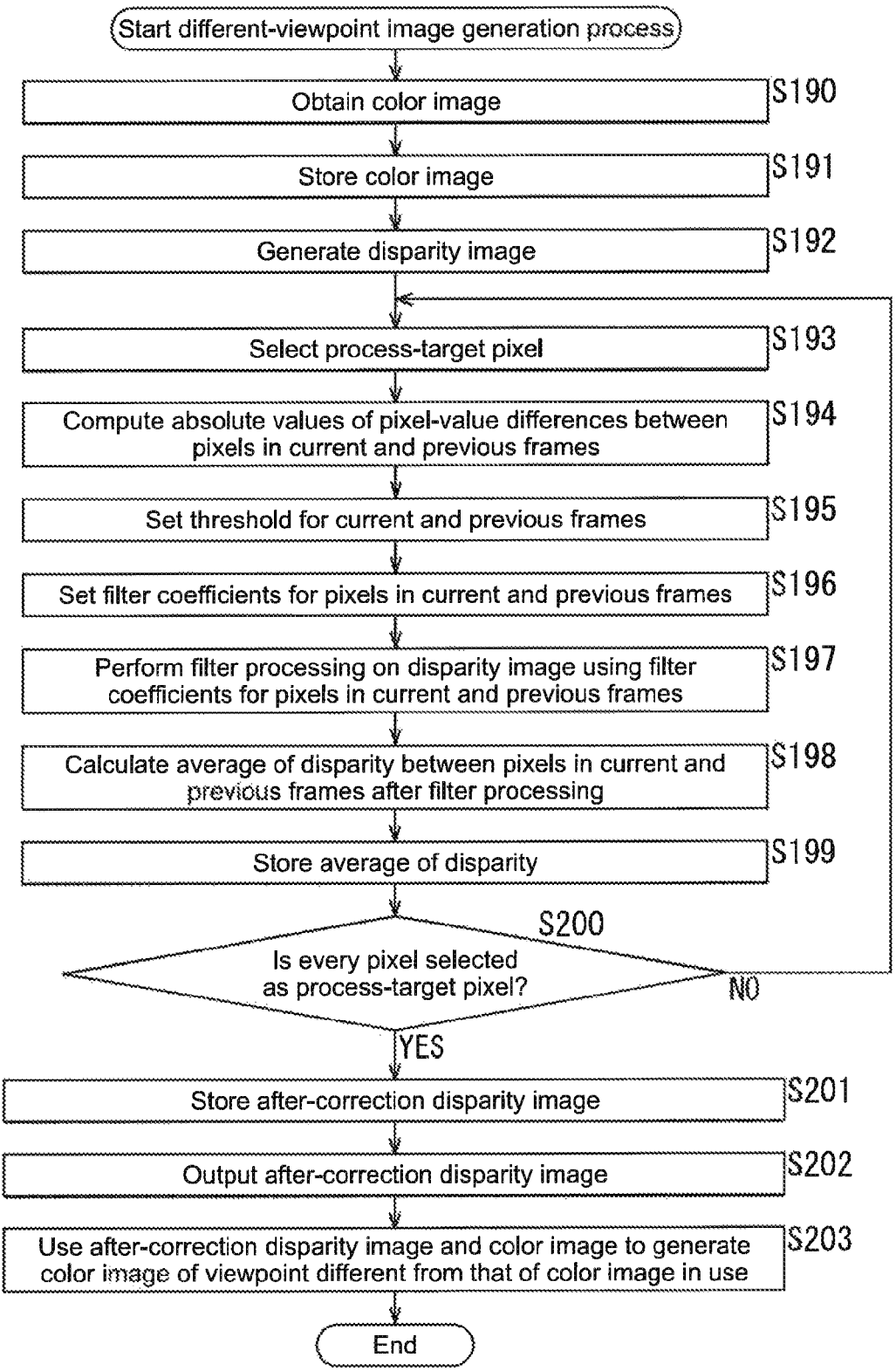
FIG. 26 is a flowchart of a different-viewpoint image generation process by the image processing apparatus in the seventh embodiment.

FIG. 26 is a flowchart of a different-viewpoint image generation process of the image processing apparatus in the seventh embodiment. This different-viewpoint image generation process is started when a one-frame color image is input from the outside, for example.

Processes in steps S190 to S192 of FIG. 26 are similar to those in steps S130 to S132 of FIG. 19, and processes in steps S193 to S196 are similar to those in steps S134 to S137 of FIG. 19, and thus are not described again.

In step S197, the processing section 116 reads an after-correction previous-frame disparity image from the memory 152, and for the current and previous frames, performs filter processing on the disparity image using filter coefficients provided by the coefficient setting section 114.

Processes in steps S198 to S200 are similar to those in steps S139 to S141 of FIG. 19, and thus are not described again. After the process in step S200, the processing section 151 provides the memory 152 with an after-correction disparity image, which is a disparity image in which disparities of pixels in storage are all corrected after the filter processing.

In step S201, the memory 152 stores the after-correction disparity image provided by the processing section 151. This disparity image is used for correcting a next-frame disparity image, which is subsequent to the current-frame disparity image.

Processes in steps S202 and S203 are similar to those in steps S142 and S143 of FIG. 19, and thus are not described again.

As described above, the asymmetric nonlinear filter 150 corrects a current-frame disparity image using an after-correction previous-frame disparity image. Therefore, when a color image shows no change with time, the resulting disparity image is with a high degree of precision and with a steeper disparity edge.

[Eighth Embodiment]

(Exemplary Configuration of Asymmetric Nonlinear Filter in Image Processing Apparatus in Eighth Embodiment)

An image processing apparatus in an eighth embodiment with the application of the present disclosure is similar to the image processing apparatus 10 of FIG. 1 except for the asymmetric nonlinear filter 12. Therefore, described in the below is only an asymmetric nonlinear filter.

Figure 27:
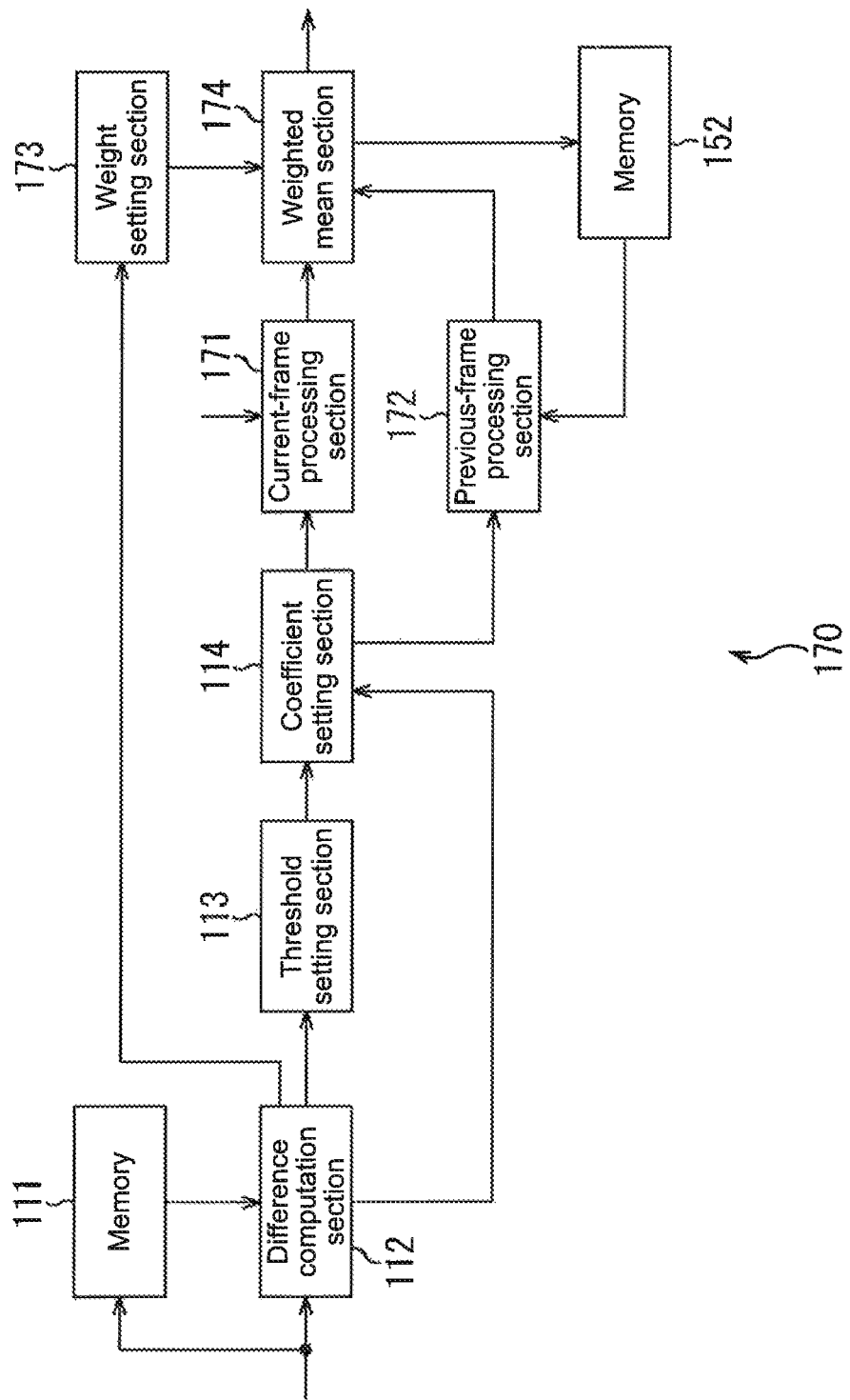
FIG. 27 is a block diagram showing an exemplary configuration of an asymmetric nonlinear filter in an image processing apparatus in an eighth embodiment with the application of the present disclosure.

FIG. 27 is a block diagram showing an exemplary configuration of an asymmetric nonlinear filter in the image processing apparatus in the eighth embodiment with the application of the present disclosure.

In the configuration of FIG. 27, any structure component similar to that of FIG. 24 is provided with the same reference numeral, and is not described again as appropriate if it is already described.

Compared with the configuration of the asymmetric nonlinear filter 150 of FIG. 24, an asymmetric nonlinear filter 170 of FIG. 27 includes three structure components as alternatives to the processing section 151, i.e., a current-frame processing section 171, a previous-frame processing section 172, and a weighted mean section 174, and is additionally provided with a weight setting section 173.

Based on screen-to-screen correlation values in color images, the asymmetric nonlinear filter 170 calculates a weighted mean between a previous-frame disparity image after filter processing and a current-frame disparity image after filter processing, thereby generating an after-correction current-frame disparity image.

To be specific, similarly to the processing section 151 of FIG. 24, using filter coefficients set by the coefficient setting section 132 for pixels in the current frame, the current-frame processing section 171 in the asymmetric nonlinear filter 170 performs filter processing on disparities of reference pixels in a current-frame disparity image provided by the disparity detection section 11. The current-frame processing section 171 provides the weighted mean section 174 with the current-frame disparity image being the result of the filter processing.

Similarly to the processing section 151, the previous-frame processing section 172 reads an after-correction previous-frame disparity image stored in the memory 152. Using filter coefficients set by the coefficient setting section 114 for pixels in the previous frame similarly to the processing section 151, the previous-frame processing section 172 performs filter processing on disparities of reference pixels in an after-correction previous-frame disparity image. The previous-frame processing section 172 provides the weighted mean section 174 with the previous-frame disparity image being the result of the filter processing.

Based on the absolute value of a pixel-value difference computed by the difference computation section 112 for a process-target pixel and each of the previous-frame reference pixels, the weight setting section 173 sets a weight coefficient for the process-target pixel respectively in the current and previous frames.

To be specific, the weight setting section 173 sets a weight coefficient based on the average of the absolute values of the pixel-value differences, e.g., the larger the average of the absolute values of the pixel-value differences is, the larger the previous-frame weight coefficient becomes, and the smaller the current-frame weight coefficient becomes. The weight setting section 173 then supplies the resulting weight coefficients to the weighted mean section 174.

Based on the weight coefficients provided by the weight setting section 173, the weighted mean section 174 calculates a weighted mean between the current-frame disparity provided by the current-frame processing section 171 after the filter processing and the previous-frame disparity provided by the previous-frame processing section 172 after the filter processing. The weighted mean section 174 then uses the disparity obtained by the calculation of the weighted mean as an after-correction disparity of the process-target pixel.

To be specific, the weighted mean section 174 is an IIR filter or others, and computes an after-correction disparity by Equation 4 below.

[Equation 4]

$$d'_t = w_1 * f(d^r) + w_2 * f(d'_{t-1}) \qquad 4$$

In Equation 4, "$d'_t$" denotes an after-correction disparity of a process-target pixel, "$w_1$" denotes a current-frame weight coefficient for the process-target pixel, and "$w_2$" denotes a previous-frame weight coefficient for the process-target pixel. Also in Equation 4, "$f(d_t)$" denotes a current-frame disparity after filter processing, and "$f(d'_{t-1})$" denotes a previous-frame disparity after filter processing.

The weighted mean section 174 provides both the different-viewpoint image generation section 13 of FIG. 1 and the memory 152 with an after-correction disparity image, which is a disparity image in which disparities of pixels are all corrected.

(Exemplary After-Correction Disparity Image)

FIGS. 28A to 28G are each a diagram showing an exemplary after-correction disparity image to be generated by the weighted mean section 174 of FIG. 27.

Figure 28:
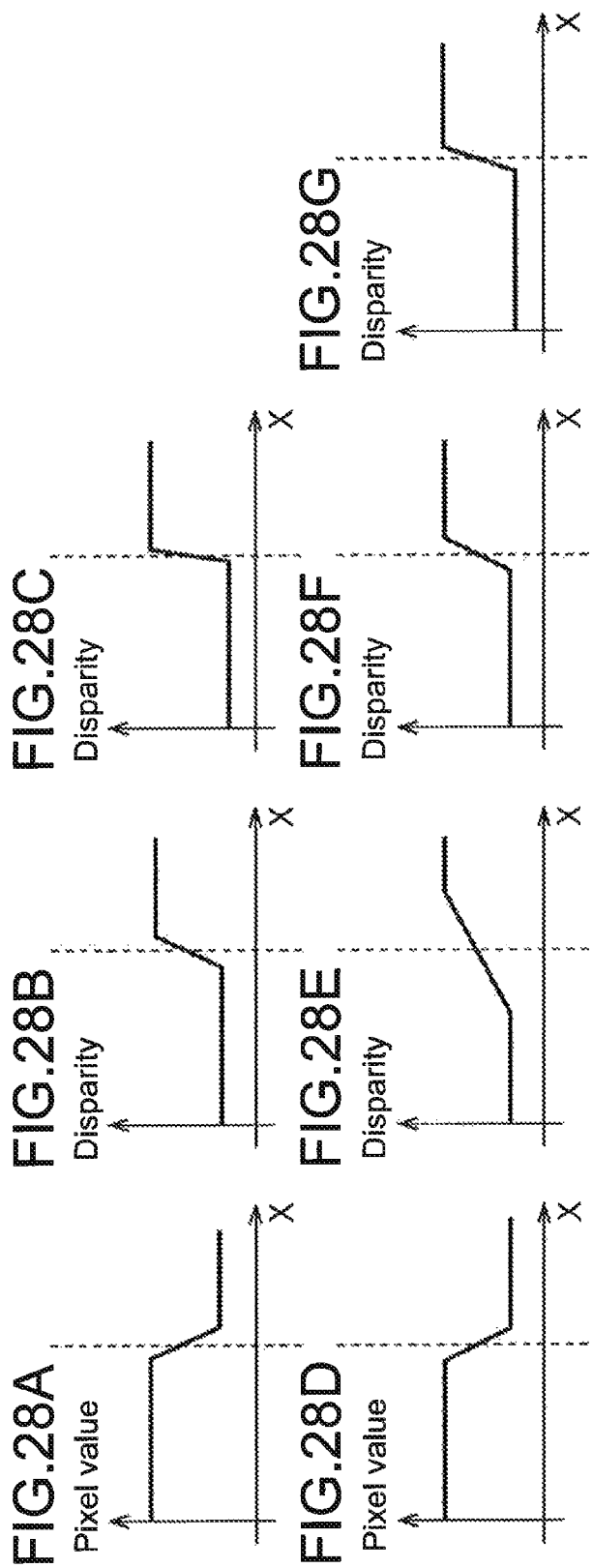
FIGS. 28A to 28G are each a diagram showing an exemplary after-correction disparity image to be generated by a weighted mean section of FIG. 27.

In FIGS. 28A to 28G, the lateral axis represents a position (X) in the horizontal direction. In FIGS. 28A and 28D, the vertical axis represents a pixel value, and in FIGS. 28B, 28C, and 28E to 28G, the vertical axis represents a disparity.

In the example of FIGS. 28A to 28G, a previous-frame color image is as shown in FIG. 28A, and as shown in FIG. 28D, a current-frame color image is the same as the previous-frame color image of FIG. 28A. A previous-frame disparity image after filter processing is as shown in FIG. 28B, and an after-correction previous-frame disparity image is as shown in FIG. 28C, i.e., being the result of disparity correction using a frame one frame before the previous frame, and the previous disparity image after filter processing.

A before-correction current-frame disparity image is as shown in FIG. 28E. That is, with no filter processing, in the before-correction current-frame disparity image of FIG. 28E, the disparity edge is more gradual than that in the previous-frame disparity image of FIG. 28C being the result of the filter processing.

In the examples of FIGS. 28A to 28G, the current-frame color image and the previous-frame color image are the same. Therefore, as shown in FIG. 28F, the current-frame disparity image after filter processing is the same as the previous-frame disparity image of FIG. 28B after the filter processing, for example.

Moreover, because the previous- and current-frame color images are the same, and because the screen-to-screen correlation values in the color images are high, a previous-frame weight coefficient is large, and a current-frame weight coefficient is small. Therefore, an after-correction current-frame disparity image is so corrected as to look more like the after-correction previous-frame disparity image of FIG. 28C compared with the current-frame disparity image of FIG. 28F after the filter processing. As a result, in the after-correction current-frame disparity image, the disparity edge becomes steeper as shown in FIG. 28G than that in the current-frame disparity image of FIG. 28F after the filter processing.

Note that, if a previous-frame color image is totally different from a current-frame color image, and if the screen-to-screen correlation values in the color images are low, the previous-frame weight coefficient is small, and the current-frame weight coefficient is small. Accordingly, the after-correction current-frame disparity image looks more like the current-frame disparity image after the filter processing.

(Description of Processing by Image Processing Apparatus)

Figure 29:
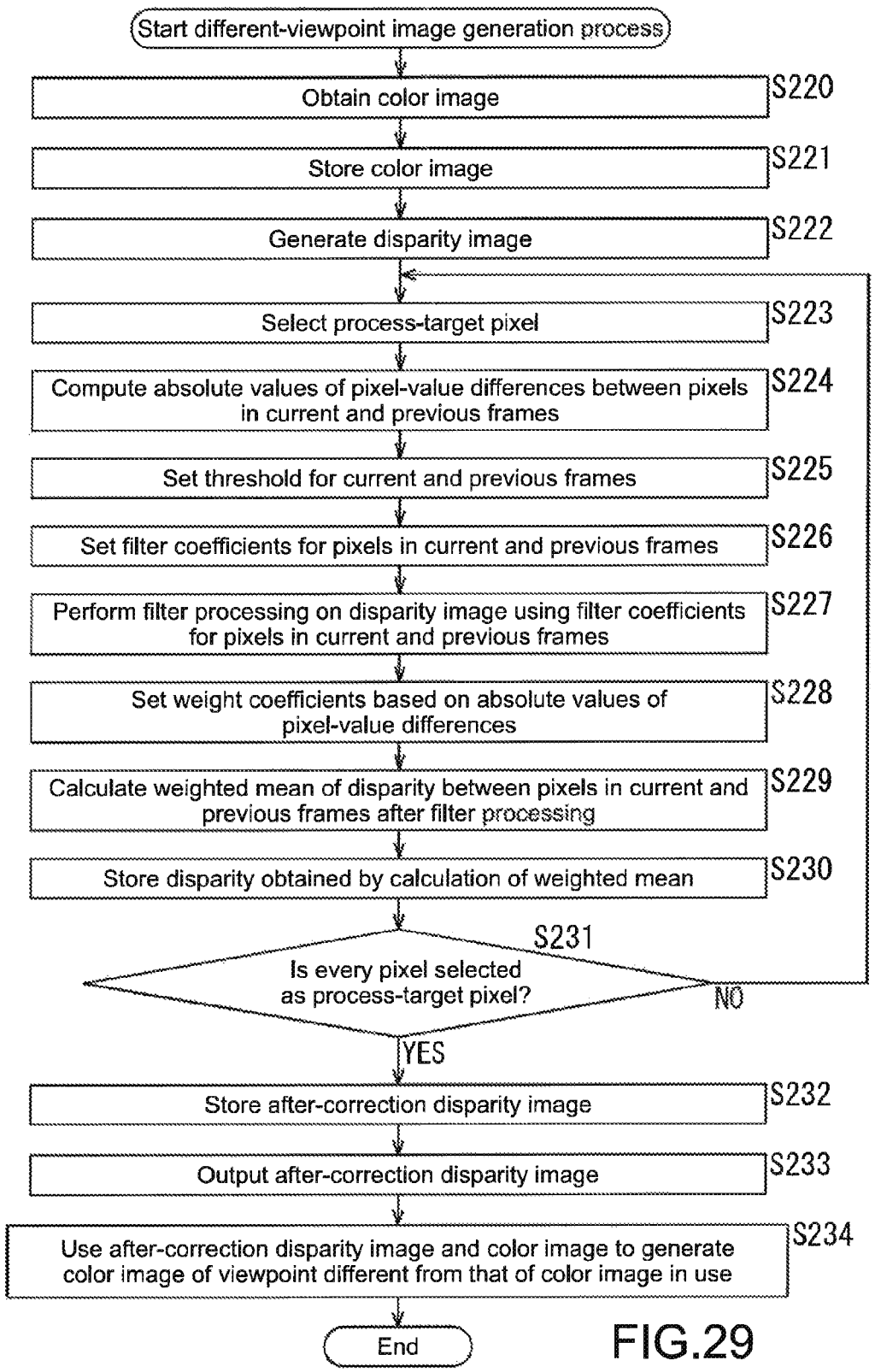
FIG. 29 is a flowchart of a different-viewpoint image generation process by the image processing apparatus in the eighth embodiment.

FIG. 29 is a flowchart of a different-viewpoint image generation process of the image processing apparatus 10 in the eighth embodiment. This different-viewpoint image generation process is started when a one-frame color image is input from the outside, for example.

Processes in steps S220 to S226 of FIG. 29 are similar to those in steps S190 to S196 of FIG. 26, and thus are not described again.

In step S227, for current and previous frames, the current-frame processing section 171 and the previous-frame processing section 172 perform filter processing on disparities of reference pixels in a disparity image using filter coefficients provided by the coefficient setting section 114. At this time, the previous-frame processing section 172 reads an after-correction previous-frame disparity image from the memory 152, and then performs filter processing on the disparity image.

In step S228, the weight setting section 173 sets a weight coefficient for a process-target pixel in the current and previous frames based on the absolute value of a pixel-value difference computed by the difference computation section 112 for the process-target pixel and each of the reference pixels in the previous frame. The weight setting section 173 then supplies the resulting weight coefficients to the weighted mean section 174.

In step S229, based on the weight coefficients provided by the weight setting section 173, by Equation 4 above, the weighted mean section 174 calculates a weighted mean between the current-frame disparity provided by the current-frame processing section 171 after the filter processing and the previous-frame disparity provided by the previous-frame processing section 172 after the filter processing.

In step S230, the weighted mean section 174 stores the disparity obtained by the calculation of the weighted mean as an after-correction disparity of the process-target pixel.

Processes in steps S231 to S234 are similar to those in steps S200 to S203 of FIG. 26, and thus are not described again.

As described above, the asymmetric nonlinear filter 170 calculates a weighted mean between current- and previous-frame disparity images after filter processing based on screen-to-screen correlation values in color images. Accordingly, even if the color images show any change with time, the resulting disparity image is with a high degree of precision.

In the eighth embodiment, a weight coefficient is set based on the screen-to-screen correlation values of a process-target pixel. Alternatively, a weight coefficient may be set based on the on-screen correlation values of a process-target pixel, motion vectors in the color image(s), and others.

[Effect Produced by Seventh and Eighth Embodiments]

Figure 30:
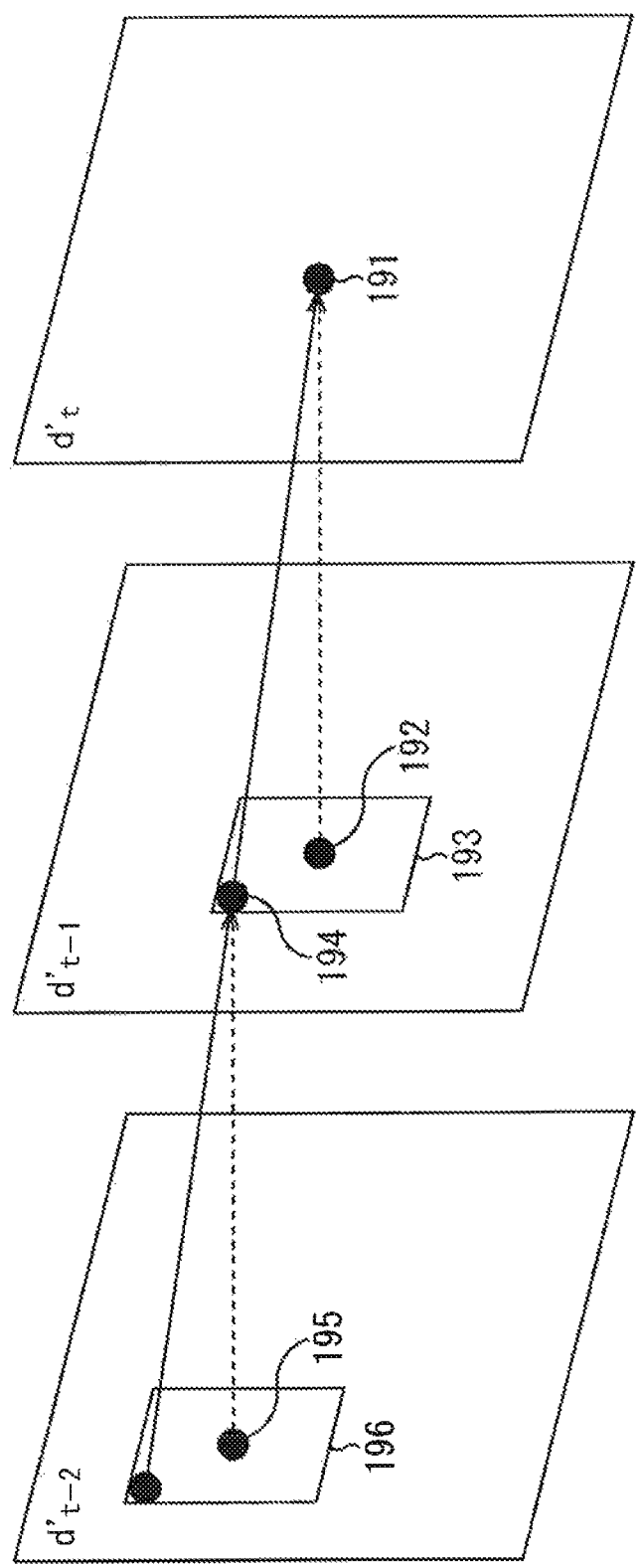
FIG. 30 is a diagram illustrating the effect produced by the seventh and eighth embodiments.

FIG. 30 is a diagram illustrating the effect produced by the seventh and eighth embodiments.

In FIG. 30, the asymmetric nonlinear filter 150 (170) is a 2D FIR filter or others, and reference pixels include pixels aligned with a process-target pixel not only in the horizontal direction but also in the vertical direction.

As in the seventh and eighth embodiments, by correcting a current-frame disparity image using an after-correction previous-frame disparity image, the spatial range is increased for reference pixels for use of filter processing.

To be specific, as exemplarily shown in FIG. 30, for disparity correction of a pixel 191 in an after-correction t-frame disparity image $d_t'$, used are disparities of pixels in an area 193 including a pixel 192 at the center, which is a previous-target pixel of the pixel 191 in an after-correction (t−1)-frame disparity image $d_{t-1}'$.

For disparity correction of a pixel 194 in the area 193 of the disparity image $d_{t-1}'$, used are disparities of pixels in an area 196 including a pixel 195 at the center, which is a previous-target pixel of the pixel 194 in an after-correction (t−2)-frame disparity image $d_{t-2}'$. For disparity correction thereafter, disparities of pixels in a frame are corrected using corrected disparities of pixels in a frame one frame before.

Accordingly, the spatial range for reference pixels for use to correct the pixel 191 is increased compared with the case of correcting the pixel using only the disparities of reference pixels at the same time. This thus improves the precision of a disparity image for disparity correction.

In the eighth embodiment, calculation of a weighted mean of disparity is additionally performed after filter processing in the seventh embodiment. This calculation of a weighted mean of disparity may be additionally performed after filter processing also in the fifth and sixth embodiments.

[Ninth Embodiment]
(Exemplary Configuration of Image Processing Apparatus in Ninth Embodiment)

Figure 31:
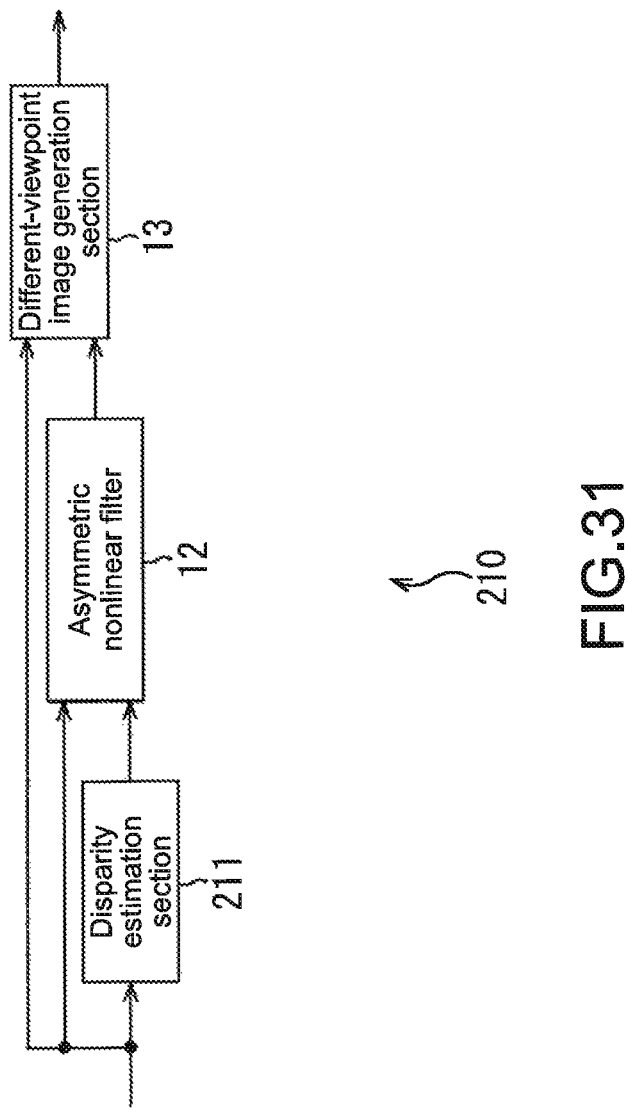
FIG. 31 is a block diagram showing an exemplary configuration of an image processing apparatus in a ninth embodiment with the application of the present disclosure.

FIG. 31 is a block diagram showing an exemplary configuration of an image processing apparatus in a ninth embodiment with the application of the present disclosure.

In the configuration of FIG. 31, any structure component similar to that of FIG. 1 is provided with the same reference numeral, and is not described again as appropriate if it is already described.

Compared with the configuration of the image processing apparatus 10 of FIG. 1, an image processing apparatus 210 of FIG. 31 is provided with a disparity estimation section 211 as an alternative to the disparity detection section 11, the asymmetric nonlinear filter 12 as an alternative to the asymmetric nonlinear filters 12-1 and 12-2, and the different-viewpoint image generation section 13 as an alternative to the different-viewpoint image generation sections 13-1 and 13-2.

The image processing apparatus 210 estimates a disparity image from a color image of a viewpoint, and corrects the disparity image for use to generate a color image of a different viewpoint.

To be specific, the disparity estimation section 211 in the image processing apparatus 210 obtains a one-viewpoint color image from the outside, and using the color image, estimates a disparity image. The disparity estimation section 211 supplies the estimated disparity image to the asymmetric nonlinear filter 12.

Note that, compared with the first embodiment, a color image input in the ninth embodiment is the one captured by imaging from one viewpoint, and this may applicable also to the second to eighth embodiments, i.e., an incoming color image may be captured by imaging from one viewpoint.

Furthermore, in the first to ninth embodiments, correlation values for use to correct a disparity image are those of pixels. Alternatively, correlation values may be those of disparities.

[Tenth Embodiment]
(Exemplary Configuration of Image Processing Apparatus in Tenth Embodiment)

Figure 32:
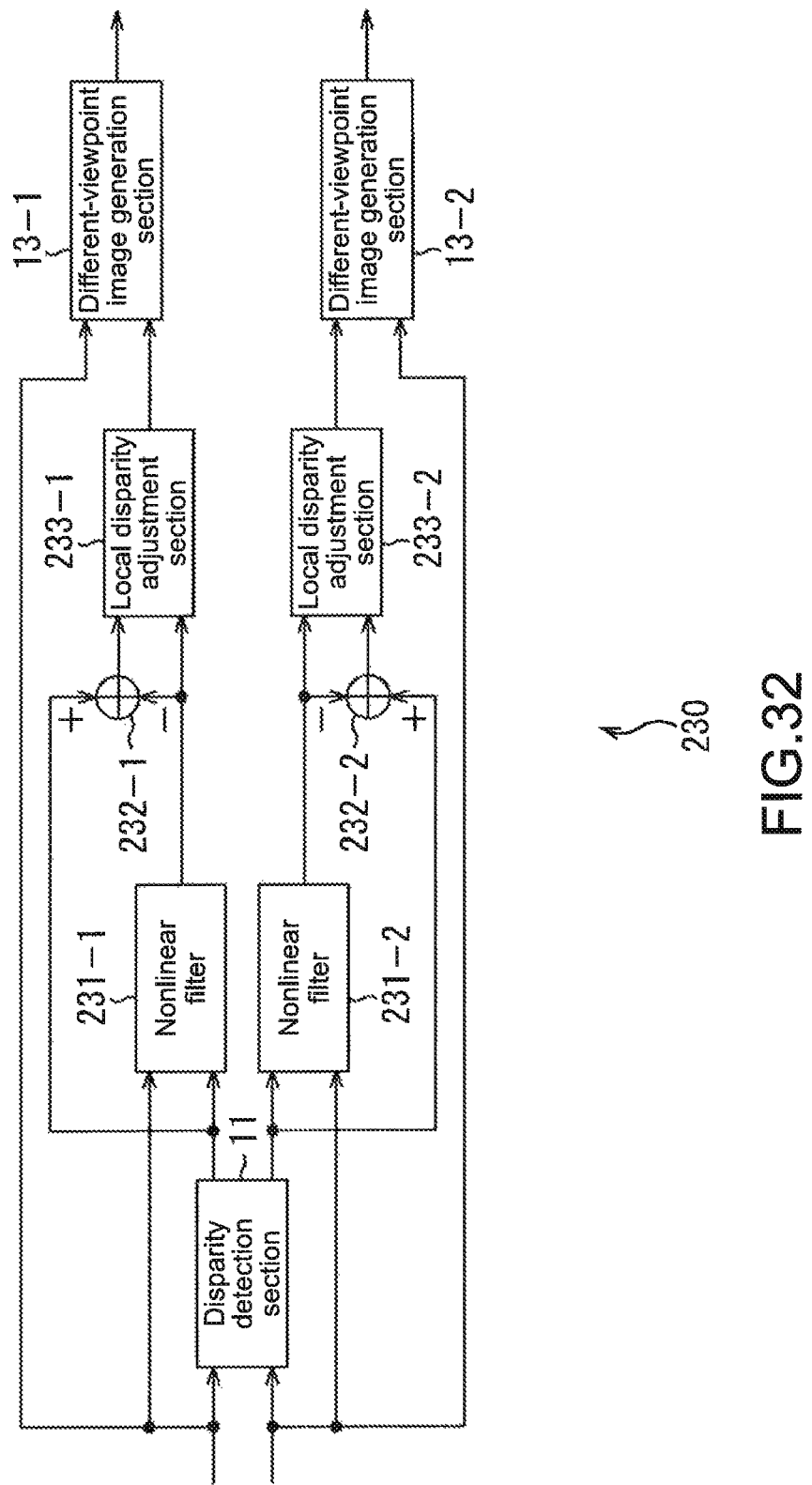
FIG. 32 is a block diagram showing an exemplary configuration of an image processing apparatus in a tenth embodiment with the application of the present disclosure.

FIG. 32 is a block diagram showing an exemplary configuration of an image processing apparatus in the tenth embodiment with the application of the present disclosure.

In the configuration of FIG. 32, any structure component similar to that of FIG. 1 is provided with the same reference numeral, and is not described again as appropriate if it is already described.

Compared with the configuration of the image processing apparatus 10 of FIG. 1, an image processing apparatus 230 of FIG. 32 is provided with nonlinear filters 231-1 and 231-2 as alternatives to the asymmetric nonlinear filters 12-1 and 12-2, and additionally includes subtraction sections 232-1 and 232-2 and local disparity adjustment sections 233-1 and 233-2.

The image processing apparatus 230 uses an after-correction disparity image to enhance any local disparity in a before-correction disparity image, and using the resulting disparity image with disparity enhancement, generates a color image of a predetermined viewpoint.

To be specific, the nonlinear filter 231-1 in the image processing apparatus 230 is a 1D horizontal FIR filter, for example. Similarly to the asymmetric nonlinear filter 12 of FIG. 1, the nonlinear filter 231-1 finds a correlation value of each pair of pixels in a left-eye color image input from the outside, and using the correlation values, sets a threshold.

Similarly to the asymmetric nonlinear filter 12, the nonlinear filter 231-1 sets filter coefficients based on the threshold and correlation values. The nonlinear filter 231-1 then performs disparity correction by Equation 5 below to have symmetrical value alignment of the filter coefficients.

[Equation 5]

$K1'=K5'=\min(K1,K5)$ $K2'=K4'=\min(K3,K4)$ $K3'=K3$            5

In Equation 5, "Ki'" (i=1, 2, 3, 4, 5) is an after-correction filter coefficient for a pixel Pi (i=1, 2, 3, 4, 5).

Using the after-correction filter coefficients, the nonlinear filter 231-1 performs filter processing on a left-eye disparity image provided by the disparity detection section 11, thereby correcting the left-eye disparity image. The nonlinear filter 231-1 supplies the resulting after-correction left-eye disparity image to both the subtraction section 232-1 and the local disparity adjustment section 233-1.

The nonlinear filter 231-2 is configured similarly to the nonlinear filter 231-1. The nonlinear filter 231-2 finds a correlation value of each pair of pixels in a right-eye color image, and based on the correlation values, sets filter coefficients for disparity correction. The nonlinear filter 231-2 performs filter processing on a right-eye disparity image using the corrected filter coefficients, thereby correcting the right-eye disparity image. The nonlinear filter 231-2 supplies the corrected right-eye disparity image to both the subtraction section 232-2 and the local disparity adjustment section 233-2.

From a before-correction left-eye disparity image detected by the disparity detection section 11, the subtraction section 232-1 subtracts the after-correction left-eye disparity image provided by the nonlinear filter 231-1. The resulting difference of the left-eye disparity image is then supplied to the local disparity adjustment section 233-1.

Similarly to the subtraction section 232-1, from a before-correction right-eye disparity image detected by the disparity detection section 11, the subtraction section 232-2 subtracts the after-correction right-eye disparity image provided by the nonlinear filter 231-2, and the resulting difference of the right-eye disparity image is supplied to the local disparity adjustment section 233-2.

The local disparity adjustment section 233-1 amplifies the difference of the left-eye disparity image provided by the subtraction section 232-1. The local disparity adjustment section 233-1 adds the amplified difference to the after-correction left-eye disparity image provided by the nonlinear filter 231-1. The left-eye disparity image in which the local disparity is enhanced is provided to the different-viewpoint image generation section 13-1.

Similarly to the local disparity adjustment section 233-1, the local disparity adjustment section 233-2 amplifies the difference from the subtraction section 232-1, and adds the amplified difference to the disparity image provided by the nonlinear filter 231-2. The local disparity adjustment section 233-2 provides the different-viewpoint image generation section 13-2 with the resulting right-eye disparity image in which the local disparity is enhanced.

In the below, when these nonlinear filters 231-1 and 231-2 are not expected to be specifically distinguished, the filters may be collectively referred to as nonlinear filter 231. Similarly, the subtraction sections 232-1 and 232-2 may be collectively referred to as the subtraction section 232, and the local disparity adjustment sections 233-1 and 233-2 may be collectively referred to as the local disparity adjustment section 233.

Figure 33:
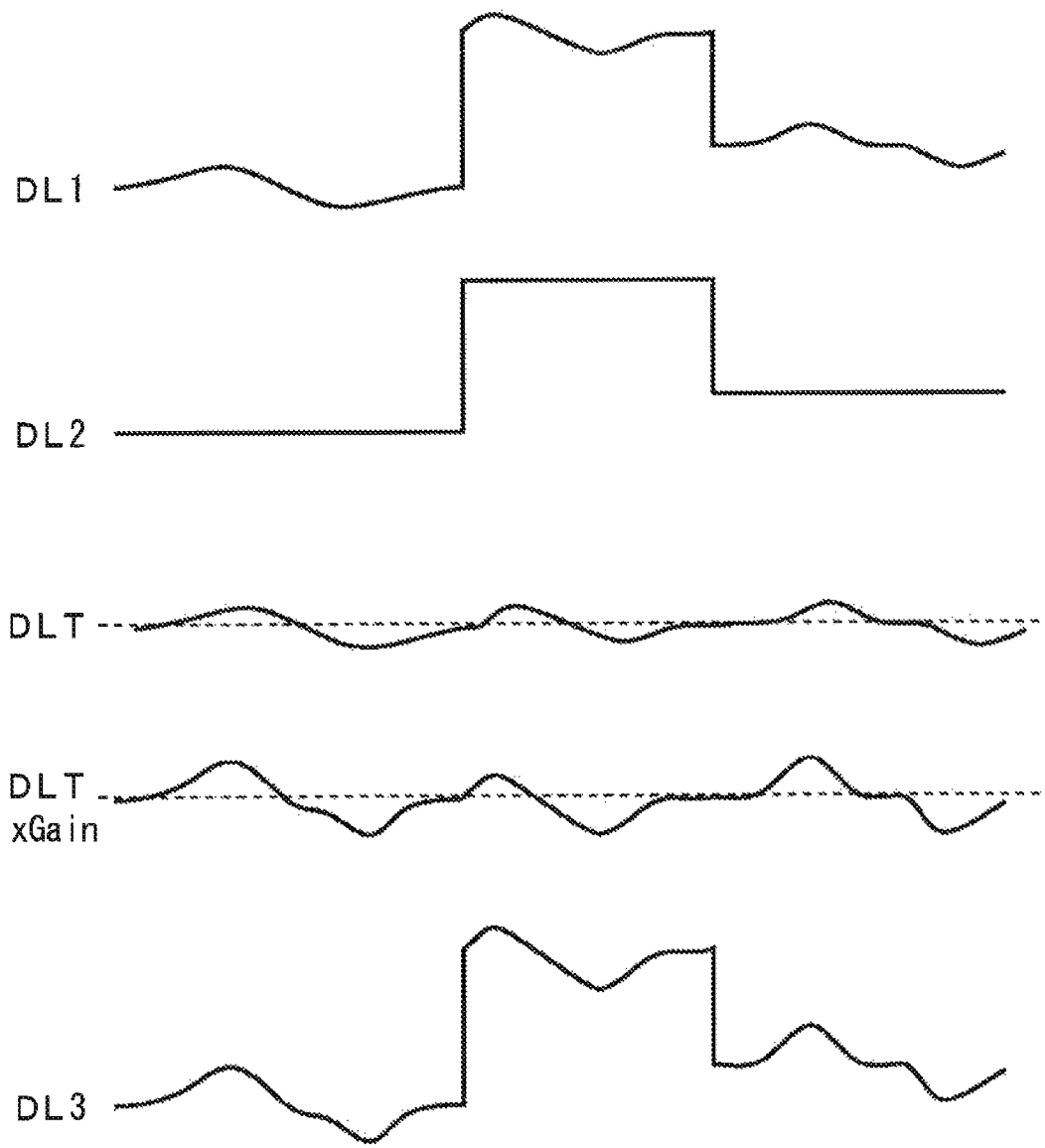
FIG. 33 is a diagram illustrating local disparity enhancement by the image processing apparatus of FIG. 32.

(Description of Local Disparity Enhancement) FIG. 33 is a diagram illustrating local disparity enhancement by the image processing apparatus 230 of FIG. 32.

As shown in FIG. 33, a disparity image DL1 generated by the disparity detection section 11 is corrected by the nonlinear filter 231, thereby obtaining an after-correction disparity image DL2 done with local smoothing. The subtraction section 232 subtracts the disparity image DL2 from the disparity image DL1, thereby obtaining a difference DLT. This difference DLT represents a local change of disparity.

The local disparity adjustment section 233 amplifies the difference DLT by a predetermined gain (Gain), and adds the amplification result of difference DLT×GAIN to the disparity image DL2, thereby obtaining a disparity image DL3. In this manner, as shown in FIG. 33, the disparity image DL3 is with a high degree of precision with enhanced local disparity compared with the disparity image DL1.

With the image processing apparatus 230, using the right- and left-eye disparity images with enhanced local disparity as above, right- and left-eye color images of a predetermined viewpoint are generated, so that the resulting 3D image is with reduced cardboard effect.

Moreover, the local disparity adjustment section 233 corrects a local change of disparity. This correction thus does not change the largest and smallest values of disparity in the entire screen, and does not impair the stereoscopic viewing.

In the tenth embodiment, a disparity image is generated using two color images of different viewpoints. Alternatively, as in the ninth embodiment, a disparity image may be generated using a color image of a viewpoint. Moreover, in the tenth embodiment, filter coefficients are set based on correlation values in a color image. Alternatively, filter coefficients may be set based on correlation values in a disparity image.

Still alternatively, also in the tenth embodiment, any of the asymmetric nonlinear filters in the first to eighth embodiments may be used as an alternative to the nonlinear filter 231 to compensate phase difference between a disparity image and a color image. Moreover, the phase difference of the disparity image compensated by the nonlinear filter 231 may be compensated by level control, frequency band control, or others for supply to the subtraction section 232.

In the description above, an after-correction disparity image is used for processing of generating a color image of a different viewpoint. Alternatively, an after-correction disparity image may be used for any other image processing.

Also in the description above, before- and after-correction disparity images have the same resolution. Alternatively, the after-correction disparity image may be increased in resolution compared with the resolution of the before-correction disparity image. If this is the case, for disparity correction of each pixel in the disparity images, used as a process-target pixel is a pixel closest to a disparity-correcting pixel in the before-correction disparity image, for example. For filter coefficient setting, also used is a distance between a pixel in the after-correction disparity image and the process-target pixel.

For determination of a correlation value, the above-described manners are not restrictive. As an example, a predetermined area, e.g., a face area or a vacant area, is detected from a color image, and a correlation value may be then determined so as to increase a correlation value of each pair of pixels in the area. Alternatively, a correlation value may be determined based on the structure of a color image.

Also in the description above, a process-target pixel has one peripheral pixel thereabove, and one peripheral pixel therebelow. Alternatively, the process-target pixel may have two peripheral pixels respectively thereabove and therebelow as many as the pixels on the right and left sides thereof. Moreover, for threshold setting, used may not only be values of pixels above and below a process-target pixel but also be values of pixels positioned in the oblique direction thereto. The number of taps of a filter is not restrictive to five.

[Eleventh Embodiment]
(Description of Computer with Application of Present Disclosure)

The series of processes described above may be performed by hardware or software. For the software to perform the series of processes described above, a program in the software is installed on a computer. Herein, the computer includes a computer in a hardware specifically designed therefor, or a general-purpose personal computer that may perform various functions by installation of various programs, for example.

Figure 34:
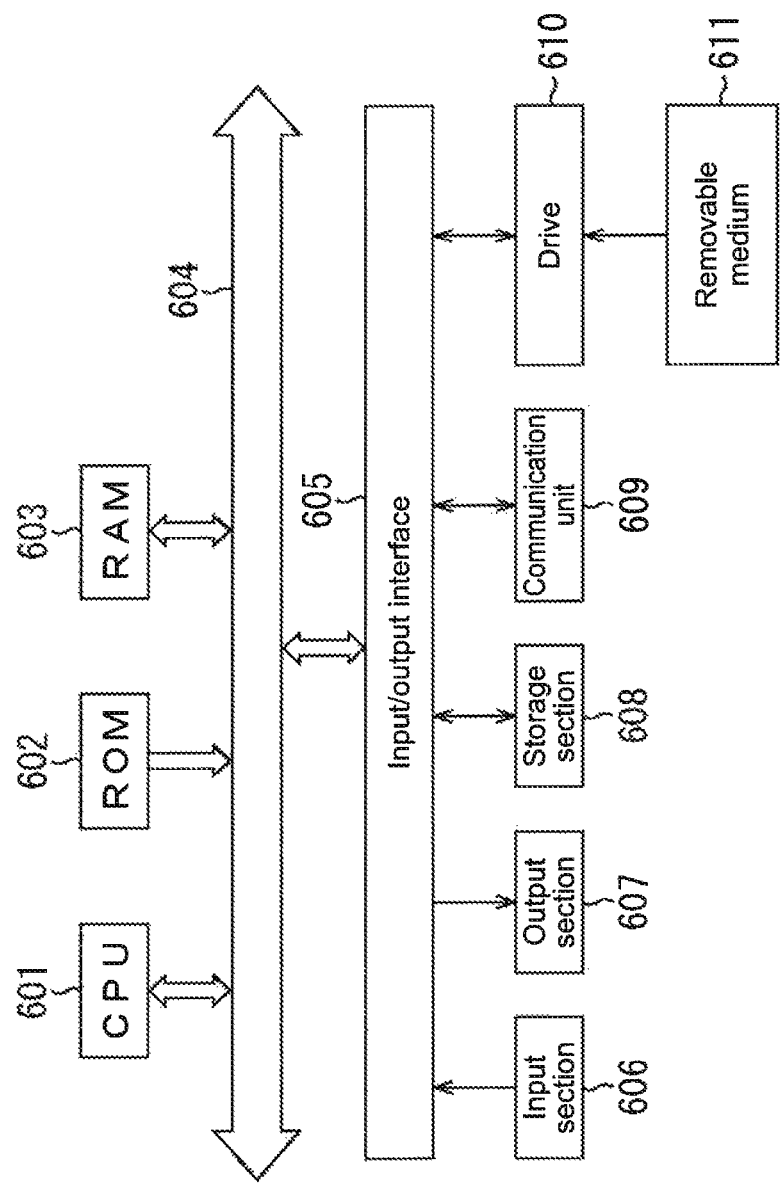
FIG. 34 is a block diagram showing an exemplary hardware configuration of a computer.

FIG. 34 is a block diagram showing an exemplary hardware configuration of a computer that performs the series of processes described above by running a program.

In the computer, a bus 604 connects together a CPU (Central Processing Unit) 601, a ROM (Read Only Memory) 602, and a RAM (Random Access Memory) 603.

The bus 604 is also connected with an input/output interface 605. The input/output interface 605 is connected with an input section 606, an output section 607, a storage section 608, a communication unit 609, and a drive 610.

The input section 606 includes a keyboard, a mouse, a microphone, and others, and the output section 607 includes a display, a speaker, and others. The storage section 608 is a hard disk, or a nonvolatile memory, for example. The communication unit 609 is a network interface, for example. The drive 610 drives a removable medium 611 exemplified by a magnetic disk, an optical disk, a magneto-optical disk, a semiconductor memory, and others.

With the computer in the above configuration, the series of processes described above are performed by the CPU 601 loading the program in the storage section 608 onto the RAM 603 via the input/output interface 605 and the bus 604, for example.

The program to be run by the computer (CPU 601) may be recorded on the removable medium 611 as a package medium or others for distribution. The program may be provided via a wired or wireless transmission medium including a local area network, the Internet, digital satellite broadcasting, and others.

With the computer, the program may be installed on the storage section 608 via the input/output interface 605 by mounting the removable medium 611 on the drive 610. The program may be installed on the storage section 608 by being received by the communication unit 609 via a wired or wireless transmission medium. The program may be also installed in advance on the ROM 602 or the storage section 608.

Note that, with the program to be run by the computer, processes may be performed in a time series manner in the described order, or in a parallel manner or anytime in response to a call.

The foregoing description of the embodiments of the present disclosure is in all aspects illustrative and not restrictive. It is understood that numerous other modifications and variations may be devised without departing from the scope of the present disclosure.

For example, the present disclosure is applicable to cloud computing with which a plurality of apparatuses are connected through a network for processing by sharing and collaboration of a function.

The steps in the flowcharts described above may be performed by one apparatus or by a plurality of apparatuses by sharing.

When one step includes various types of processing, the various types of processing in the step may be performed by one apparatus or by a plurality of apparatuses by sharing.

In the third to tenth embodiments, on-screen correlation values in a color image are absolute values of pixel-value differences. Alternatively, a similarity level of texture components may be used as in the second embodiment. Still alternatively, a reliability level may be determined in the third embodiment in combination of the third and fourth embodiments for correction of filter coefficients.

In the fifth to tenth embodiments, the reliability level may be used as a basis to correct filter coefficients similarly to the third embodiment, or leave-out pixels may be used as a basis for a value change similarly to the fourth embodiment. In the sixth embodiment, an after-correction previous-frame disparity image may be used as a previous-frame disparity image.

Still alternatively, reference pixels are not restrictive to those aligned with a process-target pixel in the horizontal or vertical direction as described above. The reference pixels may be pixels in a circular range around a process-target pixel being at the center, or pixels on a diagonal with the process-target pixel being at the center. The reference pixels may not be aligned in line, but may be selected every predetermined number of pixels, for example.

In the third embodiment, as to a reference pixel with a low reliability level, a value change of a filter coefficient therefor is not restrictive to 0, and the filter coefficient may be changed to a comparatively small value.

The present disclosure may be also in the following structures.

(1) An image processing apparatus, including:
a coefficient setting section configured to set a filter coefficient based on a correlation value in a color image; and
a processing section configured to perform filter processing on a disparity image of the color image for correction of the disparity image, the filter processing being performed using the filter coefficient set by the coefficient setting section.

(2) The image processing apparatus according to (1), in which
the coefficient setting section sets the filter coefficient based on an on-screen correlation value in the color image.

(3) The image processing apparatus according to (2), in which
the coefficient setting section sets the filter coefficient based on a pixel-to-pixel correlation value in the color image.

(4) The image processing apparatus according to (2), in which
the coefficient setting section sets the filter coefficient based on a pixel-to-pixel correlation value of texture components in the color image.

(5) The image processing apparatus according to any one of (1) to (4), further including
a reliability determination section configured to determine a reliability level for each pixel in the color image, the reliability level being determined based on the color image and the disparity image, wherein
the coefficient setting section sets the filter coefficient based on the correlation value and the reliability level.

(6) The image processing apparatus according to any one of (1) to (5), further including
a leave-out pixel determination section configured to select a leave-out pixel not for the filter processing, the leave-out pixel being selected based on the color image, wherein
the processing section changes, to a predetermined value, a disparity of the leave-out pixel in the corrected disparity image.

(7) The image processing apparatus according to any one of (1) to (6), in which
the coefficient setting section sets the filter coefficient based on a screen-to-screen coefficient value in the color image.

(8) The image processing apparatus according to (7), in which
the coefficient setting section sets the filter coefficient for a pixel respectively in the disparity image of the color image and a previous disparity image of a previous color image, the filter coefficient for the pixel in the disparity image being set based on an on-screen correlation value in the color image, the filter coefficient for the pixel in the previous disparity image being set based on a screen-to-screen correlation value in the color image, the screen-to-screen correlation value being a correlation value between the color image and the previous color image, the previous color image being temporally before the color image, and the processing section performs the filter processing on the disparity image and the previous disparity image to generate the corrected disparity image using the disparity image and the previous disparity image after the filter processing, the filter processing on the disparity image being performed using the filter coefficient for the pixel therein, the filter processing on the previous disparity image being performed using the filter coefficient for the pixel therein.

(9) The image processing apparatus according to (8), further including a motion detection section configured to detect a motion vector of a pixel in the color image, the motion vector being detected based on the color image and the previous color image, wherein the coefficient setting section corrects the filter coefficient for the pixel in the disparity image and the filter coefficient for the pixel in the previous disparity image based on the motion vector, and the processing section performs the filter processing using the filter coefficients corrected by the coefficient setting section.

(10) The image processing apparatus according to (8) or (9), in which the processing section performs the filter processing on the previous disparity image corrected by the filter processing.

(11) The image processing apparatus according to any one of (8) to (10), further including a weight setting section configured to set a weight coefficient for a pixel respectively in the disparity image and the previous disparity image, the weight coefficient being set based on the screen-to-screen coefficient value, wherein the processing section calculates a weighted mean between the disparity image and the previous disparity image after the filter processing to generate the corrected disparity image, the weighted mean being calculated using the weight coefficients set by the weight setting section.

(12) The image processing apparatus according to any one of (1) to (11), further including a different-viewpoint image generation section configured to use the disparity image corrected by the processing section and the color image to generate a color image of a viewpoint different from a viewpoint of the color image in use.

(13) The image processing apparatus according to any one of (1) to (12), further including a disparity adjustment section configured to amplify a difference of the disparity image before and after the correction by the processing section, the amplified difference being added to the disparity image corrected by the processing section.

(14) An image processing method, including:

setting a filter coefficient based on a correlation value in a color image; and performing filter processing on a disparity image of the color image for correction of the disparity image, the filter processing being performed using the filter coefficient set by the setting.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a coefficient setting section configured to set a filter coefficient based on a screen-to-screen correlation value between a color image and a previous color image temporally before the color image; and
   a processing section configured to perform filter processing on a disparity image of the color image for correction of the disparity image, the filter processing being performed using the filter coefficient set by the coefficient setting section,
   wherein the coefficient setting section is further configured to set the filter coefficient for a pixel respectively in the disparity image of the color image and a previous disparity image of the previous color image, the filter coefficient for the pixel in the disparity image being set based on an on-screen correlation value in the color image, and the filter coefficient for the pixel in the previous disparity image being set based on the screen-to-screen correlation value, and
   wherein the coefficient setting section and the processing section are each implemented via at least one processor.

2. The image processing apparatus according to claim 1, wherein
   the coefficient setting section is further configured to set the filter coefficient based on an on-screen correlation value in the color image.

3. The image processing apparatus according to claim 2, wherein
   the coefficient setting section is further configured to set the filter coefficient based on a pixel-to-pixel correlation value in the color image.

4. The image processing apparatus according to claim 2, wherein
   the coefficient setting section is further configured to set the filter coefficient based on a pixel-to-pixel correlation value of texture components in the color image.

5. The image processing apparatus according to claim 1, further comprising
   a reliability determination section configured to determine a reliability level for each pixel in the color image, the reliability level being determined based on the color image and the disparity image, wherein
   the coefficient setting section is further configured to set the filter coefficient based on the correlation value and the reliability level, and
   wherein the reliability determination section is implemented via at least one processor.

6. The image processing apparatus according to claim 1, further comprising
   a leave-out pixel determination section configured to select a leave-out pixel not for the filter processing, the leave-out pixel being selected based on the color image,
   wherein the processing section is further configured to change, to a predetermined value, a disparity of the leave-out pixel in the corrected disparity image, and
   wherein the leave-out pixel determination section is implemented via at least one processor.

7. The image processing apparatus according to claim 1, further comprising
   a different-viewpoint image generation section configured to use the disparity image corrected by the processing section and the color image to generate a color image of a viewpoint different from a viewpoint of the color image in use,
   wherein the different-viewpoint image generation section is implemented via at least one processor.

8. The image processing apparatus according to claim 1, further comprising
a disparity adjustment section configured to amplify a difference of the disparity image before and after the correction by the processing section, the amplified difference being added to the disparity image corrected by the processing section,
wherein the disparity adjustment section is implemented via at least one processor.

9. An image processing method, implemented via at least one processor, the method comprising:
setting a filter coefficient based on a screen-to-screen correlation value between a color image and a previous color image temporally before the color image; and
performing filter processing on a disparity image of the color image for correction of the disparity image, the filter processing being performed using the filter coefficient set by the setting,
wherein the filter coefficient is set for a pixel respectively in the disparity image of the color image and a previous disparity image of the previous color image, the filter coefficient for the pixel in the disparity image being set based on an on-screen correlation value in the color image, and the filter coefficient for the pixel in the previous disparity image being set based on the screen-to-screen correlation value.

10. An image processing apparatus, comprising:
a coefficient setting section configured to set a filter coefficient based on a screen-to-screen correlation value between a color image and a previous color image temporally before the color image; and
a processing section configured to perform filter processing on a disparity image of the color image for correction of the disparity image, the filter processing being performed using the filter coefficient set by the coefficient setting section,
wherein the coefficient setting section is further configured to set the filter coefficient for a pixel respectively in the disparity image of the color image and a previous disparity image of a previous color image, the filter coefficient for the pixel in the disparity image being set based on an on-screen correlation value in the color image, the filter coefficient for the pixel in the previous disparity image being set based on the screen-to-screen correlation value in the color image,
wherein the processing section is further configured to perform the filter processing on the disparity image and the previous disparity image to generate the corrected disparity image using the disparity image and the previous disparity image after the filter processing, the filter processing on the disparity image being performed using the filter coefficient for the pixel therein, the filter processing on the previous disparity image being performed using the filter coefficient for the pixel therein, and
wherein the coefficient setting section and the processing section are each implemented via at least one processor.

11. The image processing apparatus according to claim 10, further comprising
a motion detection section configured to detect a motion vector of a pixel in the color image, the motion vector being detected based on the color image and the previous color image,
wherein the coefficient setting section is further configured to correct the filter coefficient for the pixel in the disparity image and the filter coefficient for the pixel in the previous disparity image based on the motion vector,
wherein the processing section is further configured to perform the filter processing using the filter coefficients corrected by the coefficient setting section, and
wherein the motion detection section is implemented via at least one processor.

12. The image processing apparatus according to claim 10, wherein
the processing section is further configured to perform the filter processing on the previous disparity image corrected by the filter processing.

13. The image processing apparatus according to claim 10, further comprising
a weight setting section configured to set a weight coefficient for the pixel respectively in the disparity image and the previous disparity image, the weight coefficient being set based on the screen-to-screen coefficient value,
wherein the processing section is further configured to calculate a weighted mean between the disparity image and the previous disparity image after the filter processing to generate the corrected disparity image, the weighted mean being calculated using the weight coefficients set by the weight setting section, and
wherein the weight setting section is implemented via at least one processor.

* * * * *